(12) United States Patent
Mikić et al.

(10) Patent No.: US 10,988,248 B2
(45) Date of Patent: Apr. 27, 2021

(54) VTOL AIRCRAFT

(71) Applicant: Joby Aero, Inc., Santa Cruz, CA (US)

(72) Inventors: Gregor Veble Mikić, Santa Cruz, CA (US); Alex Stoll, Santa Cruz, CA (US); JoeBen Bevirt, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 16/859,930

(22) Filed: Apr. 27, 2020

(65) Prior Publication Data
US 2020/0361601 A1 Nov. 19, 2020

Related U.S. Application Data

(60) Provisional application No. 62/983,445, filed on Feb. 28, 2020, provisional application No. 62/838,773, filed on Apr. 25, 2019.

(51) Int. Cl.
| | |
|---|---|
| *B64C 3/38* | (2006.01) |
| *B64C 29/00* | (2006.01) |
| *B64C 7/00* | (2006.01) |
| *B64C 27/52* | (2006.01) |
| *B64C 1/06* | (2006.01) |

(52) U.S. Cl.
CPC ............ *B64C 29/0033* (2013.01); *B64C 3/38* (2013.01); *B64C 7/00* (2013.01); *B64C 27/52* (2013.01); *B64C 1/061* (2013.01); *B64C 1/068* (2013.01)

(58) Field of Classification Search
CPC ......... B64C 29/0033; B64C 3/38; B64C 7/00; B64C 27/52
See application file for complete search history.

(56) References Cited

U.S. PATENT DOCUMENTS

| | | |
|---|---|---|
| 1,386,713 A | 8/1921 | Leinweber et al. |
| 1,496,723 A | 6/1924 | Miller |
| 1,794,202 A | 2/1931 | Pickard |
| D171,509 S | 2/1954 | Lightbourn et al. |
| 2,868,476 A | 1/1959 | Schlieben |
| 2,969,935 A | 1/1961 | Price |
| 2,981,339 A | 4/1961 | Kaplan |
| 3,002,712 A | 10/1961 | Sterling |
| 3,035,789 A | 5/1962 | Young |
| 3,059,876 A | 10/1962 | Platt |
| 3,081,964 A | 3/1963 | Quenzler |
| 3,082,977 A | 3/1963 | Melvin |

(Continued)

FOREIGN PATENT DOCUMENTS

| | | |
|---|---|---|
| CN | 103363993 B | 4/2016 |
| CN | 107042884 A | 8/2017 |

(Continued)

OTHER PUBLICATIONS

European Search Report for Application No. 15765064.9 dated Oct. 16, 2017.

(Continued)

*Primary Examiner* — Justin M Benedik
(74) *Attorney, Agent, or Firm* — Jeffrey Schox

(57) ABSTRACT

The aircraft can include: an airframe, a tilt mechanism, a payload housing, and can optionally include an impact attenuator, a set of ground support members (e.g., struts), a set of power sources, and a set of control elements. The airframe can include: a set of rotors and a set of support members.

18 Claims, 30 Drawing Sheets

(56) References Cited

U.S. PATENT DOCUMENTS

| | | | |
|---|---|---|---|
| 3,089,666 A | 5/1963 | Quenzler | |
| 3,136,499 A | 6/1964 | Kessler | |
| 3,141,633 A * | 7/1964 | MacKay | B64C 29/0033 |
| | | | 244/7 C |
| 3,159,361 A | 12/1964 | Weiland | |
| 3,181,810 A | 5/1965 | Olson | |
| 3,231,221 A | 1/1966 | Platt | |
| 3,259,343 A | 7/1966 | Roppel | |
| 3,350,035 A | 10/1967 | Schlieben | |
| 3,360,217 A | 12/1967 | Trotter | |
| 3,404,852 A | 10/1968 | Sambell et al. | |
| 3,592,412 A | 7/1971 | Glatfelter | |
| 3,693,910 A | 9/1972 | Aldi | |
| 3,795,372 A | 3/1974 | Feldman | |
| 3,834,654 A | 9/1974 | Miranda | |
| 3,856,238 A | 12/1974 | Malvestuto | |
| 4,022,405 A | 5/1977 | Peterson | |
| 4,047,840 A | 9/1977 | Ravenhall et al. | |
| 4,053,125 A | 10/1977 | Ratony | |
| 4,146,199 A | 3/1979 | Wenzel | |
| 4,356,546 A | 10/1982 | Whiteside et al. | |
| 4,387,866 A | 6/1983 | Eickmann | |
| 4,519,746 A | 5/1985 | Wainauski et al. | |
| 4,784,351 A | 11/1988 | Eickmann | |
| 4,799,629 A | 1/1989 | Mori | |
| 4,914,657 A | 4/1990 | Walter et al. | |
| 4,925,131 A | 5/1990 | Eickmann | |
| 4,979,698 A | 12/1990 | Lederman | |
| 4,982,914 A | 1/1991 | Eickmann | |
| 5,031,858 A | 7/1991 | Schellhase et al. | |
| 5,082,079 A | 1/1992 | Lissaman et al. | |
| 5,085,315 A | 2/1992 | Sambell | |
| 5,141,176 A | 8/1992 | Kress et al. | |
| 5,184,304 A | 2/1993 | Huddle | |
| 5,374,010 A | 12/1994 | Stone et al. | |
| 5,405,105 A | 4/1995 | Kress | |
| 5,419,514 A | 5/1995 | Duncan | |
| 5,515,282 A | 5/1996 | Jackson | |
| 5,715,162 A | 2/1998 | Daigle | |
| 5,806,805 A | 9/1998 | Elbert et al. | |
| 5,823,468 A | 10/1998 | Bothe | |
| 5,839,691 A | 11/1998 | Lariviere | |
| 5,842,667 A | 12/1998 | Jones | |
| 5,868,351 A | 2/1999 | Stamps et al. | |
| 6,098,923 A | 8/2000 | Peters | |
| 6,254,032 B1 | 7/2001 | Bucher | |
| 6,260,796 B1 | 7/2001 | Klingensmith | |
| 6,276,633 B1 | 8/2001 | Balayn et al. | |
| 6,286,783 B1 | 9/2001 | Kuenkler | |
| 6,293,491 B1 | 9/2001 | Wobben | |
| 6,343,127 B1 | 1/2002 | Billoud | |
| 6,402,088 B1 | 6/2002 | Syrovy et al. | |
| 6,474,604 B1 | 11/2002 | Carlow | |
| 6,561,455 B2 | 5/2003 | Capanna | |
| 6,625,033 B1 | 9/2003 | Steinman | |
| 6,655,631 B2 | 12/2003 | Austen-Brown | |
| 6,719,244 B1 | 4/2004 | Gress | |
| 6,745,977 B1 | 6/2004 | Long et al. | |
| 6,883,748 B2 | 4/2005 | Yoeli | |
| 6,892,980 B2 | 5/2005 | Kawai | |
| 7,048,505 B2 | 5/2006 | Segota et al. | |
| 7,118,066 B2 | 10/2006 | Allen | |
| 7,147,182 B1 | 12/2006 | Flanigan | |
| 7,159,817 B2 | 1/2007 | VanderMey et al. | |
| 7,219,013 B1 | 5/2007 | Young et al. | |
| 7,263,630 B2 | 8/2007 | Sailer | |
| 7,310,573 B2 | 12/2007 | Stickling | |
| 7,318,565 B2 | 1/2008 | Page | |
| 7,376,088 B2 | 5/2008 | Gambardella et al. | |
| 7,802,754 B2 | 9/2010 | Karem | |
| 7,822,516 B2 | 10/2010 | Yanaka et al. | |
| 7,857,253 B2 | 12/2010 | Yoeli | |
| 7,857,254 B2 | 12/2010 | Parks | |
| 7,874,513 B1 | 1/2011 | Smith | |
| 8,016,226 B1 | 9/2011 | Wood | |
| 8,056,866 B2 | 11/2011 | De Roche | |
| 8,152,096 B2 | 4/2012 | Smith | |
| 8,275,494 B1 | 9/2012 | Roth | |
| 8,376,264 B1 | 2/2013 | Hong et al. | |
| 8,469,306 B2 | 6/2013 | Kuhn | |
| 8,485,464 B2 | 7/2013 | Kroo | |
| 8,527,233 B2 | 9/2013 | McIntyre | |
| 8,602,347 B2 | 12/2013 | Isaac et al. | |
| 8,616,492 B2 | 12/2013 | Oliver | |
| 8,708,273 B2 | 4/2014 | Oliver | |
| 8,733,690 B2 | 5/2014 | Bevirt et al. | |
| 8,800,912 B2 | 8/2014 | Oliver | |
| 8,849,479 B2 | 9/2014 | Walter | |
| 8,998,125 B2 | 4/2015 | Hollimon et al. | |
| 9,102,401 B2 | 8/2015 | Collins et al. | |
| 9,128,109 B1 | 9/2015 | ONeill | |
| 9,415,870 B1 | 8/2016 | Beckman et al. | |
| 9,435,661 B2 | 9/2016 | Brenner et al. | |
| 9,694,911 B2 | 7/2017 | Bevirt et al. | |
| 9,786,961 B2 | 10/2017 | Dyer et al. | |
| 9,944,386 B1 | 4/2018 | Reichert et al. | |
| 9,963,228 B2 | 5/2018 | McCullough et al. | |
| 10,046,855 B2 | 8/2018 | Bevirt et al. | |
| 10,144,503 B1 | 12/2018 | Vander Lind et al. | |
| 10,183,746 B2 | 1/2019 | McCullough et al. | |
| 10,246,184 B2 | 4/2019 | Ragland | |
| 10,287,011 B2 | 5/2019 | Wolff et al. | |
| 10,364,036 B2 | 7/2019 | Tighe et al. | |
| 10,392,107 B2 * | 8/2019 | Har | B64D 41/007 |
| 10,497,996 B1 | 12/2019 | Muniz et al. | |
| 10,513,334 B2 | 12/2019 | Groninga et al. | |
| 2003/0038213 A1 | 2/2003 | Yoeli | |
| 2003/0062443 A1 | 4/2003 | Wagner et al. | |
| 2003/0080242 A1 | 5/2003 | Kawai | |
| 2003/0085319 A1 | 5/2003 | Wagner et al. | |
| 2003/0094537 A1 | 5/2003 | Austen-Brown | |
| 2003/0106959 A1 | 6/2003 | Fukuyama | |
| 2004/0126241 A1 | 7/2004 | Zha et al. | |
| 2004/0195460 A1 | 10/2004 | Sailer | |
| 2004/0245376 A1 | 12/2004 | Muren | |
| 2005/0178879 A1 | 8/2005 | Mao | |
| 2005/0230524 A1 | 10/2005 | Ishiba | |
| 2006/0016930 A1 | 1/2006 | Pak | |
| 2006/0097103 A1 | 5/2006 | Atmur | |
| 2006/0113426 A1 | 6/2006 | Yoeli | |
| 2006/0226281 A1 | 10/2006 | Walton | |
| 2007/0221779 A1 | 9/2007 | Ikeda | |
| 2008/0048065 A1 | 2/2008 | Kuntz | |
| 2008/0205416 A1 | 8/2008 | DeChiara | |
| 2008/0283673 A1 | 11/2008 | Yoeli | |
| 2009/0008499 A1 | 1/2009 | Shaw | |
| 2009/0084907 A1 | 4/2009 | Yoeli | |
| 2009/0140102 A1 | 6/2009 | Yoeli | |
| 2009/0159757 A1 | 6/2009 | Yoeli | |
| 2009/0200431 A1 | 8/2009 | Konings et al. | |
| 2009/0224095 A1 | 9/2009 | Cox et al. | |
| 2009/0283629 A1 | 11/2009 | Kroetsch et al. | |
| 2010/0072325 A1 | 3/2010 | Sambell | |
| 2010/0076625 A1 | 3/2010 | Yoeli | |
| 2010/0100260 A1 | 4/2010 | McIntyre et al. | |
| 2010/0193644 A1 | 8/2010 | Karem | |
| 2010/0264257 A1 | 10/2010 | Brunken | |
| 2010/0270419 A1 | 10/2010 | Yoeli | |
| 2010/0270435 A1 | 10/2010 | Karem | |
| 2011/0001020 A1 | 1/2011 | Forgac | |
| 2011/0042508 A1 | 2/2011 | Bevirt | |
| 2011/0042509 A1 | 2/2011 | Bevirt et al. | |
| 2011/0042510 A1 | 2/2011 | Bevirt et al. | |
| 2011/0049306 A1 | 3/2011 | Yoeli | |
| 2011/0049307 A1 | 3/2011 | Yoeli | |
| 2011/0139923 A1 | 6/2011 | Papanikolopoulos et al. | |
| 2011/0139939 A1 | 6/2011 | Martin et al. | |
| 2011/0147533 A1 | 6/2011 | Goossen et al. | |
| 2011/0315809 A1 | 12/2011 | Oliver | |
| 2012/0025016 A1 | 2/2012 | Methven et al. | |
| 2012/0061526 A1 | 3/2012 | Brunken | |
| 2012/0091257 A1 | 4/2012 | Wolff et al. | |
| 2012/0234968 A1 | 9/2012 | Smith | |
| 2013/0132548 A1 | 5/2013 | Cabos | |

(56) References Cited

U.S. PATENT DOCUMENTS

| | | |
|---|---|---|
| 2013/0201316 A1 | 8/2013 | Binder et al. |
| 2013/0204544 A1 | 8/2013 | Thomas |
| 2014/0299708 A1 | 10/2014 | Green et al. |
| 2014/0358333 A1 | 12/2014 | White et al. |
| 2015/0012154 A1 | 1/2015 | Senkel et al. |
| 2015/0056058 A1 | 2/2015 | Grissom et al. |
| 2015/0102659 A1 | 4/2015 | Liffring et al. |
| 2015/0136897 A1* | 5/2015 | Seibel .......... B64C 29/0033 244/6 |
| 2015/0147181 A1 | 5/2015 | Henze et al. |
| 2015/0232178 A1 | 8/2015 | Reiter |
| 2015/0266571 A1 | 9/2015 | Bevirt et al. |
| 2015/0360794 A1 | 12/2015 | Certain et al. |
| 2016/0031555 A1 | 2/2016 | Bevirt et al. |
| 2016/0031556 A1 | 2/2016 | Bevirt et al. |
| 2016/0083073 A1 | 3/2016 | Beckman |
| 2016/0112151 A1 | 4/2016 | Chedas et al. |
| 2016/0144957 A1 | 5/2016 | Claridge et al. |
| 2016/0272312 A1 | 9/2016 | Mallard |
| 2016/0294882 A1 | 10/2016 | Michaels |
| 2016/0304194 A1 | 10/2016 | Bevirt et al. |
| 2017/0101176 A1 | 4/2017 | Alber et al. |
| 2017/0104385 A1 | 4/2017 | Salamon et al. |
| 2017/0274983 A1 | 9/2017 | Beckman et al. |
| 2017/0277152 A1 | 9/2017 | Liu et al. |
| 2017/0297431 A1 | 10/2017 | Epstein et al. |
| 2018/0002016 A1 | 1/2018 | McCullough et al. |
| 2018/0105279 A1* | 4/2018 | Tighe .......... B64D 29/02 |
| 2018/0237148 A1 | 8/2018 | Hehn et al. |
| 2018/0244370 A1 | 8/2018 | Lombard |
| 2018/0251226 A1 | 9/2018 | Fenny et al. |
| 2018/0290736 A1 | 10/2018 | Mikic et al. |
| 2018/0319491 A1 | 11/2018 | Kearney-Fischer |
| 2018/0354615 A1 | 12/2018 | Groninga et al. |
| 2018/0356439 A1 | 12/2018 | Luo et al. |
| 2019/0210740 A1 | 7/2019 | Luo |
| 2019/0214161 A1 | 7/2019 | Chen et al. |

FOREIGN PATENT DOCUMENTS

| | | |
|---|---|---|
| DE | 102012104783 A1 | 12/2013 |
| EP | 0945841 A1 | 9/1999 |
| EP | 3366583 A1 | 8/2018 |
| GB | 1271102 A | 4/1972 |
| WO | 03074924 A1 | 9/2003 |
| WO | 03086857 A1 | 10/2003 |
| WO | 2019001203 A1 | 1/2019 |
| WO | 2019056053 A1 | 3/2019 |

OTHER PUBLICATIONS

International Search Report and Written Opinion for Application No. PCT/US10/46500 dated Apr. 13, 2011.

International Search Report and Written Opinion for Application No. PCT/US15/21344 dated Sep. 11, 2015.

International Search Report and Written Opinion for Application No. PCT/US15/21350 dated Sep. 15, 2015.

International Search Report and Written Opinion for Application No. PCT/US2017/059809 dated Jul. 31, 2018.

International Search Report and Written Opinion for PCT Application No. PCT/US2019/039247 dated Sep. 13, 2019.

International Search Report and Written Opinion for PCT Application No. PCT/US2019035236 dated Aug. 20, 2019.

"Airfolds Blade Profile", Mecaflux Heliciel, Propeller & Wing, https://www.heliciel.com/en/aerodynamique-hydrodynamique/profils%20aile%20profil%20pale.htm.

"Curtiss-Wright X-19", Wikipedia, https://en.wikipedia.org/wiki/Curtiss-Wright_X-19.

"Inclined Flat Plate", Aerodynamics of the airplane, Feb. 13, 2016.

International Search Report and Written Opinion of the ISA dated Dec. 4, 2019 for PCT/US19/51565.

International Search Report and Written Opinion of the ISA, dated Jul. 24, 2019, for application No. PCT/US19/31863.

Carson, Biz, "First Look: Uber Unveils New Design for Uber Eats Delivery Drone", https:www.forbes.com/sites/bizcarson/2019/10/28/first-look-uber-unveils-new-design-for-uber-eats-delivery-drone/#1703f8d778f2.

Denham, Jr., James W., et al., "Converging on a Precision Hover Control Strategy for the F35B Stovl Aircraft", AIAA Guidance, Navigation and Control Conference and Exhibit Aug. 18-21, 2006, Honolulu, Hawaii, Abstract only.

Falco, Gianluca, et al., "Loose and Tight GNSS/INS Integrations: Comparison of Performance Assessed in Real Urban Scenarios", Sensors (Basel) Feb. 2017; 17 (2): 225, https://www.ncbi.nlm.nih.gov/pmc/articles/PMC5335985/.

Gold, Phillip J., et al., "Design and Pilot Evaluation of the RAH-66 Comanche Selectable Control Modes", https://ntrs.nasa.gov/search.jsp?, N94-13322, pp. 419-431, Jul. 1, 1993.

Kim, Tae, "Reduction of Tonal Propeller Noise by Means of Uneven Blade Spacing", University of California, Irvine, Thesis, publication date 2016.

Saraf, A. Amit Kumar, et al., "Study of Flow Separation on Airfoil with Bump", International Journal of Applied Engineering Research ISSN 09773-4562, vol. 13, No. 16 (2018), pp. 128686-12872.

Sullivan, Brenda M., et al., "A Subject Test of Modulated Blade Spacing for Helicopter Main Rotors", Presented at the American Helicopter Society 58th Annual Forum, Montreal, Canada, Jun. 11-13, 2002, http://ntrs.nasa.gov/search.jsp.

Yeh, Y.C. (Bob), "Triple-Triple Redundant 777 Primary Flight Computer", 1996, IEEE, pp. 293-307 (Year: 1996).

Young, Larry A., "Conceptual Design Aspects of Three General Sub-Classes of Multi-Rotor Configurations: Distributed, Modular, and Hetergenerous", NASA Ames Research Center, Moffett Field, CA 94035, Published 2015, Computer Science.

* cited by examiner

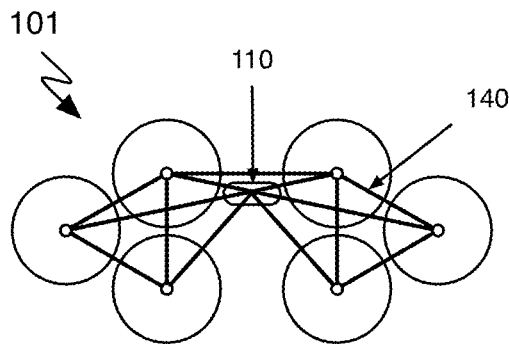
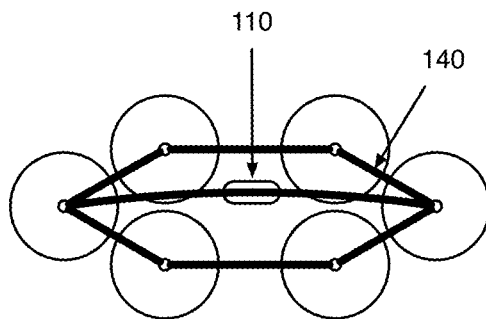
FIGURE 4A
FIGURE 4B
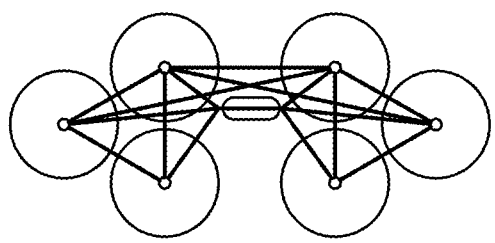
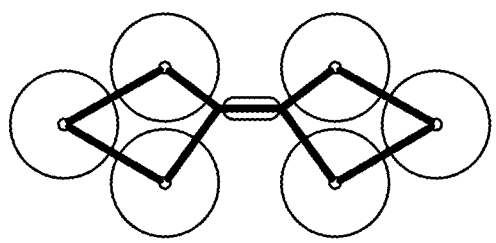
FIGURE 4C
FIGURE 4D
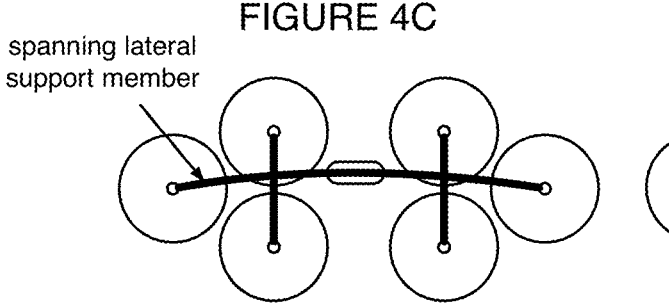
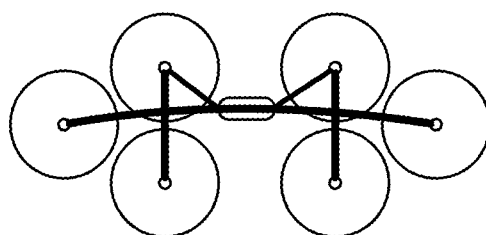
FIGURE 4E
FIGURE 4F
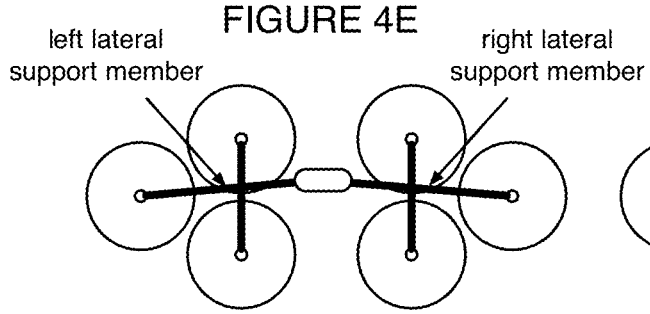
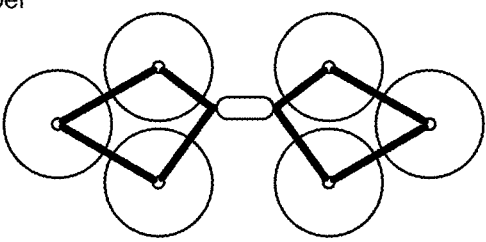
FIGURE 4G
FIGURE 4H

200

300

200

300

300

200

300

200

300

200

VTOL AIRCRAFT

CROSS-REFERENCE TO RELATED APPLICATIONS

This application claims the benefit of U.S. Provisional Application No. 62/838,773, filed 25 Apr. 2019, which is incorporated in its entirety by this reference. This application claims the benefit of US Provisional Application No. 62/983,445, filed 28 Feb. 2020, which is incorporated in its entirety by this reference.

This application is related to U.S. application Ser. No. 16/708,280, filed 9 Dec. 2019, U.S. application Ser. No. 16/430,163, filed 3 Jun. 2019, and U.S. application Ser. No. 16/409,653, filed 10 May 2019, each of which is incorporated in its entirety by this reference.

TECHNICAL FIELD

This invention relates generally to the aviation field, and more specifically to a new and useful aircraft in the aviation field.

BRIEF DESCRIPTION OF THE FIGURES

FIGS. 4A-4H are each a schematic representation a different variant of the airframe in the forward arrangement from a front view.

DESCRIPTION OF THE PREFERRED EMBODIMENTS

Figure 1A:
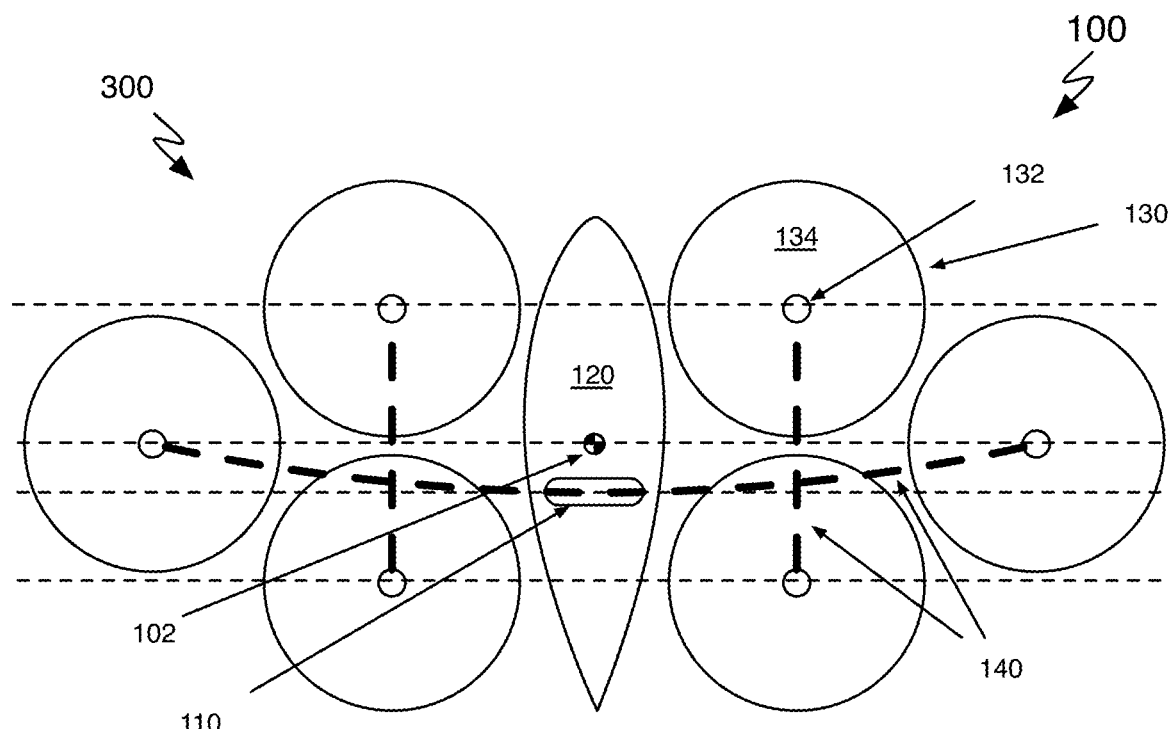
FIG. 1A is a schematic representation a variant of the system in the hover arrangement from a top view.
Figure 1B:
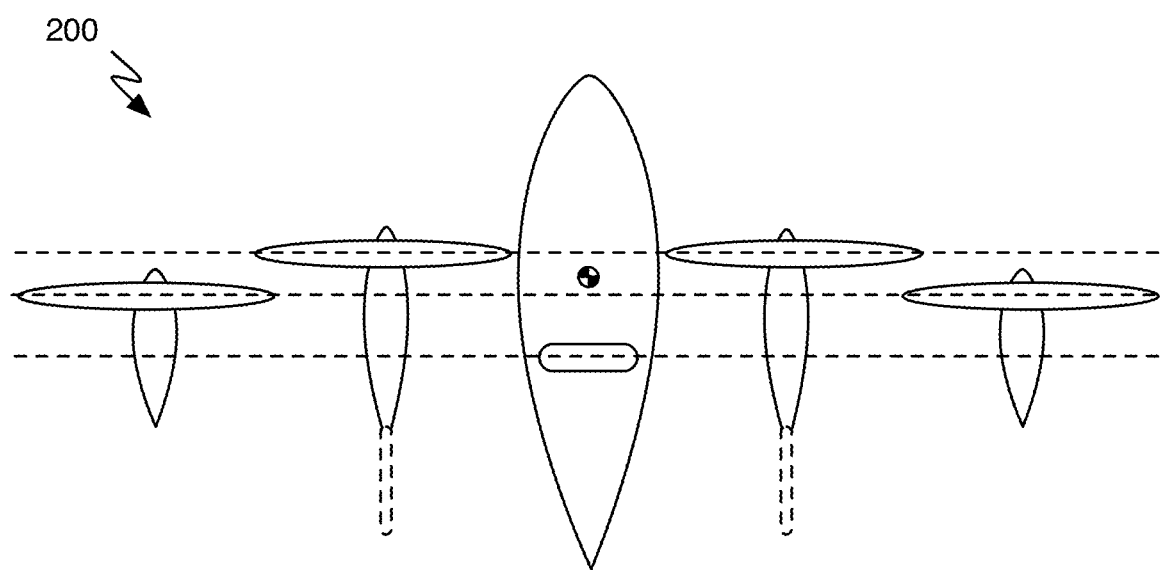
FIG. 1B is a schematic representation the variant of the system in FIG. 1A in the forward arrangement from a top view.
Figure 1C:
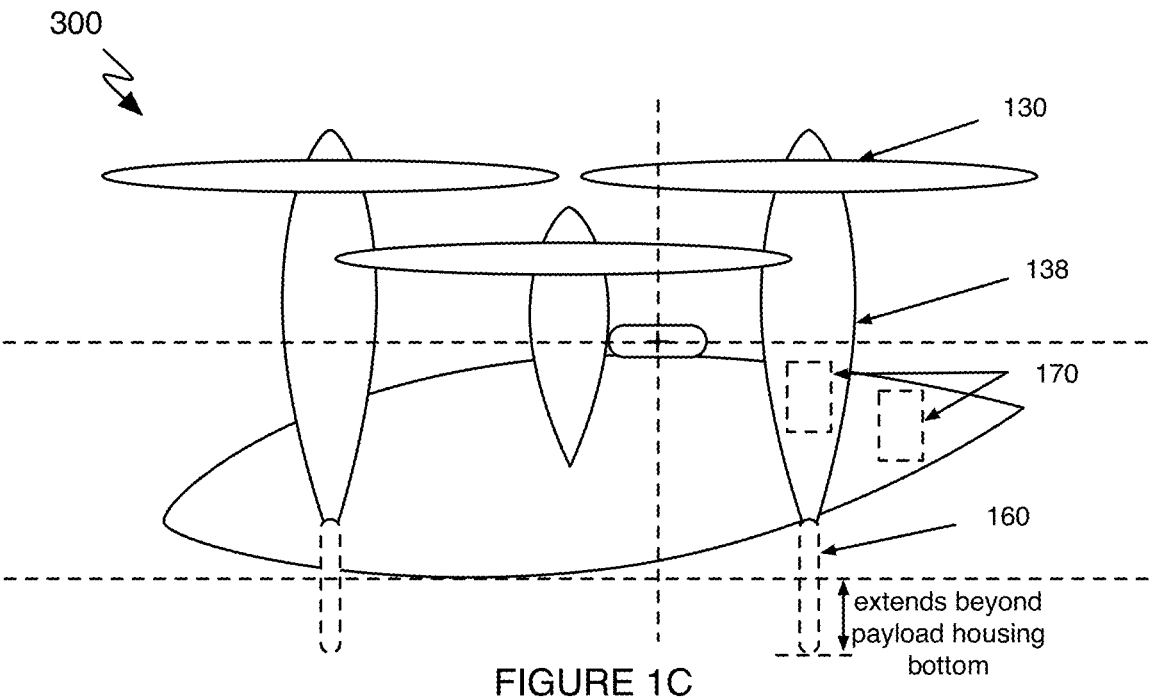
FIG. 1C is a side view of the variant of the system in FIG. 1A in the hover arrangement.
Figure 1D:
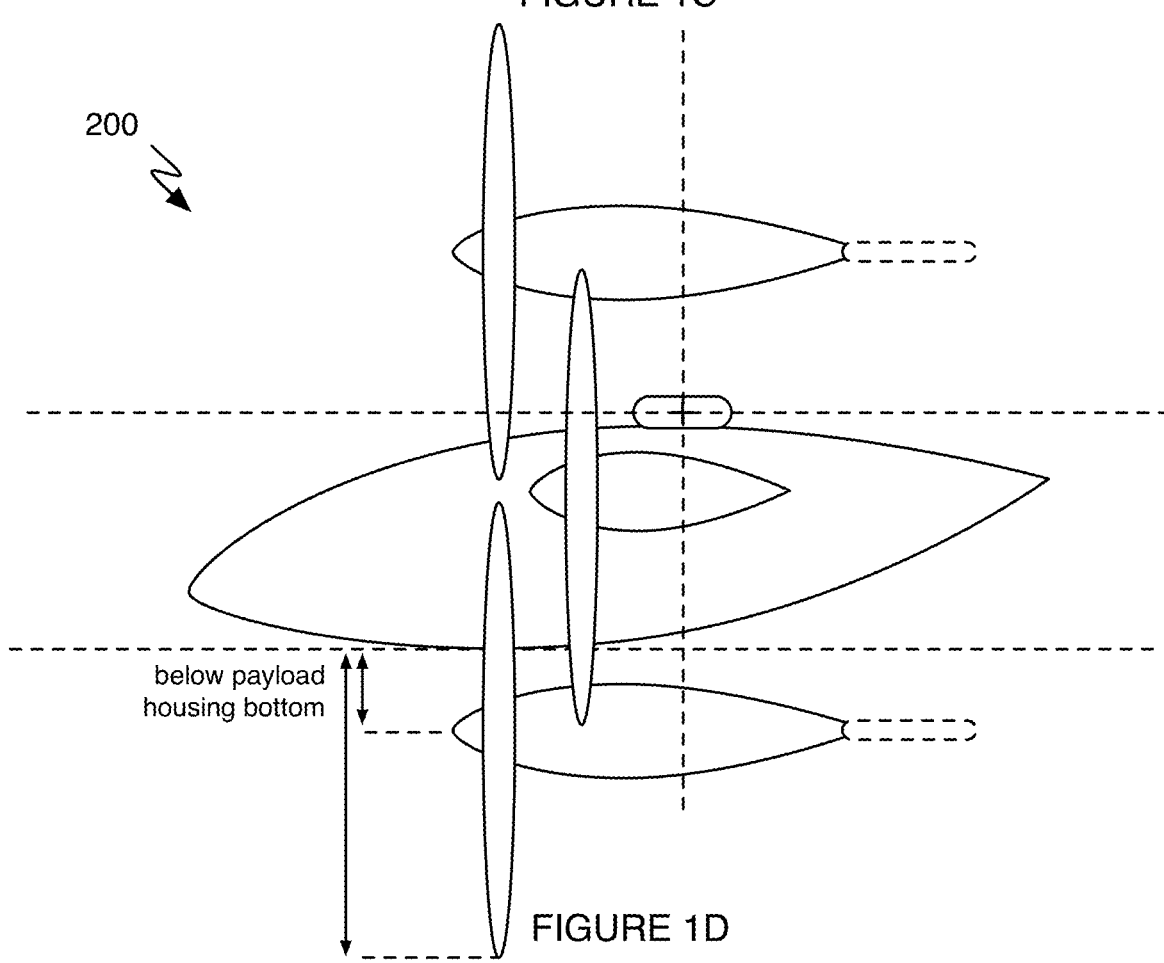
FIG. 1D is a side view of the variant of the system in FIG. 1B in the forward arrangement.

The following description of the preferred embodiments of the invention is not intended to limit the invention to these preferred embodiments, but rather to enable any person skilled in the art to make and use this invention.

1. Overview

The aircraft 100 can include: an airframe 101, a tilt mechanism 110, a payload housing 120, and can optionally include an impact attenuator 150, a set of ground support members (e.g., struts) 160, a set of power sources 170, and a set of control elements 180. The airframe can include: a set of rotors 130 and a set of support members 140. However, the aircraft 100 can additionally or alternatively include any other suitable set of components. A first example of the aircraft 100 is shown in FIGS. 1A-1D. A second example of the aircraft is shown in FIGS. 25A-F.

The term "rotor" as utilized herein, in relation to the aircraft or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, a tiltrotor aircraft can be referred to as a tilt-propeller aircraft, a tilt-prop aircraft, and/or otherwise suitably referred to or described.

The term "center of gravity" (CoG) as utilized herein, in relation to the aircraft 100 or otherwise, can refer to a point from which the weight of the body or system may be considered to act, and is interchangeable with the term "center of mass" (CoM) herein (e.g., under assumption of substantially uniform gravity). The CoG of the aircraft can refer to the aircraft CoG in any suitable state and/or configuration: loaded and/or unloaded; forward, transition, and/or vertical configuration; airframe without and/or without payload housing attached; and/or any other suitable aircraft state or configuration.

The term "center of lift" (CoL) as utilized herein can refer to the point where the sum total of all lift generated by aircraft parts—principally by wings, rotors, control surfaces, and/or aerodynamic fuselage parts (e.g., exterior of cargo housing) but additionally or alternatively by other aircraft components—generates a net moment of zero about the CoL and the aggregate lift force (e.g., collectively generated by the aircraft components) will act through the CoL while in an atmosphere. The CoL can be the same as the CoG, collocated with the CoG, forward of the CoG, rearward of the CoG, outboard of the CoG, inboard of the CoG, and/or otherwise positioned relative to the CoG. The CoL (and/or the location of the CoL relative to the CoG) can be controllable and/or adjustable by control of the rotors, tilt mechanism, control surfaces, shifting the CoG to account for different distributions of mass (e.g., passengers, cargo, fuel, etc.) onboard the aircraft, and/or otherwise controlled. In a first specific example, the control of the rotors is adjusted such that the CoL is substantially the same as the CoG (or otherwise located on the vertical axis), resulting in stable forward flight.

The term "aerodynamic center," in reference to a rotor, wing, airfoil, or otherwise, can refer to the point around which the aerodynamic moments do not change with changes in aircraft attitude. The aerodynamic center can be in the same location as the CoL or can be in a different location from the CoL. References to the CoL hereinafter can be equally applicable to the aerodynamic center, or be treated differently.

The term "geometric center of the rotors" can refer to an absolute or relative point (e.g., relative to the airframe across all positions of the tilt axis) which minimizes the sum of distances to the centers of all the rotors (e.g., rotor hubs) in 3-space or in a projected plane (e.g., vertical/lateral plane, frontal plane, top plane, etc.). Alternately, the geometric center of the rotors can refer to the average location of the rotors, a point equidistant to each rotor pair, and/or can be otherwise suitably defined.

The term "center of thrust" (CoT) as utilized herein can refer to the location at which the resultant or total thrust can be taken to act (magnitude and direction, the latter being sometimes referred to as the 'thrust line'). The CoT can be controllable and/or adjustable by control of the rotors, tilt mechanism, and/or drag-inducing components (e.g., cargo housing, landing gear, etc.). In a first specific example, the CoT acts through the CoG of the aircraft (e.g., is aligned with the CoG), and there is no resulting moment causing the aircraft to pitch, yaw, or roll. In a second specific example, the CoT does not act through the CoG of the aircraft, and there is a resulting moment which will cause the aircraft to pitch, yaw, or roll (unless counteracted by another aircraft moment).

The term "substantially" as utilized herein can mean: exactly, approximately, within a predetermined threshold or tolerance, and/or have any other suitable meaning.

In examples, components of the systems and method described herein can be used, replaced, and/or combined with the aircrafts described in U.S. application Ser. No. 14/218,845, filed 14 Mar. 2014 and/or U.S. application Ser. No. 14/662,085, filed 18 Mar. 2018. However, the systems and methods can be otherwise configured.

2. Benefits

Variations of the technology can afford several benefits and/or advantages.

First, variations of this technology can generate lift with the rotors of the aircraft in a forward and/or transition flight mode. By utilizing a larger rotor blade area (and/or larger rotor disc area) and adjusting the blade pitch and RPM, the rotors can augment the lift generated by the aerodynamic profile of the aircraft in the forward flight mode in addition to providing forward thrust. Generating lift with the rotors can augment the lift generated by the aerodynamic profile of the aircraft (e.g., wings/support member geometry, fuselage geometry, etc.) or otherwise generate sufficient lift to support the aircraft in a forward configuration.

Second, variations can utilize shorter and/or stiffer support members (e.g., wings), which can improve the handling characteristics of the aircraft (e.g., tighter turning radius, smaller required landing zone, etc.). Variants with shorter/stiffer support members reduce the risk of whirl flutter, which can weaken and/or destroy the wings, and results in an unsatisfactory/dangerous ride experience. Reducing the risk of whirl flutter can be particularly beneficial in variants utilizing a smaller wing area relative to the total rotor area, as smaller airfoil cross sections can result in a reduction in rigidity. Variants with shorter/stiffer support members can reduce the total profile of the aircraft (e.g., size of the aircraft—particularly the width), can be lower cost, and can reduce the drag of the aircraft.

Third, variants generating lift with the rotors can reduce or eliminate additional control surfaces (e.g., wing flaps, ailerons, ruddervators, elevators, rudder, etc.) on the aircraft since the thrust and motor torque is controllable (thereby indirectly controlling lift) at each rotor, thereby enabling pitch, yaw, and/or roll control during forward flight. In some variants, the aircraft is not required to bank to turn in the forward configuration because a set of anti-lateral support members and/or rotors can generate lateral aerodynamic forces (e.g., in sideslip) and/or net yaw moments to change the heading of the aircraft. The first, second, and third specific variants can independently or collectively reduce and/or eliminate any suitable set of control surfaces on the aircraft, enable lift generation with rotors, heading changes without banking the aircraft, and/or elimination of any suitable set of control surfaces. In a first specific example, full control authority can be achieved about axes perpendicular to the average rotor axis—angular accelerations around those axes can be achieved through thrust redistribution of rotors. Along the predominant rotor axis, rotation can be achieved via redistribution of torque to individual motors such that the desired total axial thrust is preserved. Additionally, if rotor axes are slightly canted relative to each other (e.g., different angles of attack, different angles of attack relative to the wing), redistribution of thrust amongst them can also create additional moments along the average axis of all the rotors. However, the rotors can otherwise suitably generate lift.

Fourth, variations of this technology can utilize a large total rotor disc area relative to the width of the aircraft and/or a large rotor blade area relative to the wing area, which can reduce the acoustic profile of the aircraft. Utilizing a large blade area for each individual rotor (e.g., for a given rotor disc diameter) allows for low rotor tip speeds (e.g., relative to tip speeds of a rotor of the effective rotor disc diameter, Mach 0.3, etc.), which can reduce the acoustic profile for the aircraft. Additionally, large rotor blades areas for each individual rotor can enable rotors to operate more efficiently for lift generation during forward flight (as discussed above). However, the aircraft can otherwise suitably reduce the acoustic profile and/or include other suitable rotors.

Fifth, variants of the technology utilize a non-structural payload housing, which allows the payload housing to be lighter and lower cost. In such variants, support members (and/or torsion boxes) can be arranged above and/or behind the payload housing to avoid infringing on the payload housing space providing more space for passengers/cargo and reducing/eliminating the need for additional structural support in the payload housing. In variants utilizing a non-structural payload housing, the component count in the payload housing can be reduced, as batteries, the primary electrical architecture, control systems, sensors, and other components can be moved to other parts of the aircraft (e.g., wings, support members, nacelles, etc.). In variants, the payload housing can be non-structural because it does not need to support landing gear loads, because the aircraft does not utilize conventional landing gear. Instead, struts on the nacelles (which extend to the ground in the hover configuration) provide a reliable, light weight, and low cost means to support the aircraft on the ground, and can further provide aerodynamic advantages in forward flight because of their streamlined geometry. Struts on the nacelles directly transfer landing gear loads to the support members (e.g., airframe) without directing them through the payload housing. In variants, the payload housing can be non-structural because the support structure of the airframe (e.g., the set of structural members) can provide the structural rigidity and attachment points for the aircraft components. However, non-structural payload housings can be otherwise achieved. In variants of the technology utilizing a non-structural payload housing, the payload housing can be modular, detachable, and/or reconfigurable to allow faster loading/unloading of cargo (e.g., passengers, cargo, etc.), which can improve the uptime of the aircraft. Additionally, modular, detachable, and/or reconfigurable payload housings can enable additional means of ground transport of a pod, such as towing, vehicular transport, or other modes of module transportation. Further, variants utilizing a modular and/or reconfigurable payload housing option can enable switching aircraft frames for faster charging and/or refueling to further improve operational efficiency.

Sixth, variants of the technology can minimize points of failure because the aircraft is capable of landing in any orientation of the tilt mechanism, with one or more rotors inoperable, and/or with one or more control surfaces inoperable. In a specific example, if the tilt mechanism is stuck and/or locked between the forward and hover configurations, the aircraft can still land by reorienting the rotors vertically (e.g., by controlling the pitch of the aircraft upwards) with the payload housing at an angle (e.g., skewed/pitched upwards) relative to the ground. In variants, this is possible due to the number and distribution of redundant rotors on the aircraft, but can be otherwise achieved. Variants of the technology can utilize an impact attenuator to ensure that passengers and/or cargo are protected when landing in a skewed orientation of the payload housing (e.g., if the tilt mechanism fails between the forward configuration and the hover configuration).

Seventh, variants of the technology offer improved stability, trim, and/or maneuverability in all modes of flight. Variants can achieve this stability by axis alignment of the center of (forward) thrust with the center of drag (and/or gravity) and the center of lift with the center of gravity in the forward flight mode, and axis alignment of the center of lift (e.g., vertical rotor thrust) with the weight vector in the hover mode. Axis alignment of one or more axes can be achieved by trimming (e.g., automatically) the thrust and/or lift distribution of the rotors, such as by power distribution between rotors, actuation of rotor blades, and/or other suitable control. In variants, the geometric center of the rotors (e.g., average hub location) is substantially aligned with the (forward) thrust and/or center of drag in the forward flight mode (e.g., with or without selective power provision), so as to minimize the trimming required, enable even power distribution, and/or maintain control authority (e.g., required power redistribution does not exceed a threshold, power redistribution is within continuous operation regime of motors). In other variants, the geometric center of the rotors can be misaligned with the center of mass; in these variants, the rotors can be selectively powered (e.g., power selectively redistributed) to adjust the thrust and/or lift distribution of the rotors into the trimmed condition. In specific examples, the rotor placement can be selected to substantially equally distribute power across the rotors despite this misalignment (e.g., to maintain control authority and efficiency; minimize trimming), or be otherwise arranged. Additionally, variants including smaller/stiffer support members (e.g., wings) offer improved handling characteristics because they can perform tighter turns and require a smaller area in order to land. In some variants, the aircraft is not required to bank in order to turn during forward (and hover/transition) flight modes, which can improve handling and/or ride comfort for passengers.

However, variations of the technology can additionally or alternately provide any other suitable benefits and/or advantages.

3. System

The aircraft 100 can include: an airframe, a tilt mechanism, a payload housing, and can optionally include an impact attenuator, a set of ground support members (e.g., struts), a set of power sources, and a set of control elements. However, the aircraft 100 can additionally include any other suitable set of components.

Figure 2:
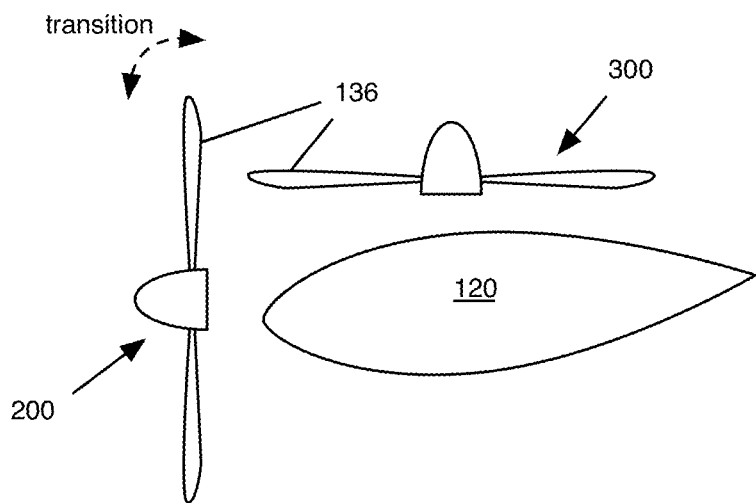
FIG. 2 is a schematic representation of a variant of the system transforming a rotor between a forward configuration and a hover configuration.

The aircraft 100 can be to any suitable type of aircraft. The aircraft 100 is preferably a tilt-wing aircraft (e.g., other similarly configured aircraft which tilt lateral support members relative to the payload housing), but can additionally or alternately be a tilt-rotor aircraft, rotorcraft, propeller aircraft, fixed wing aircraft, lighter-than-air aircraft, heavier-than-air aircraft, and/or any other suitable aircraft. The aircraft can operate as: VTOL, STOL, STOVL, takeoff like a fixed wing aircraft, land like a fixed wing aircraft, and/or operate in any other suitable manner. The aircraft can be manned, unmanned (e.g., autonomous, remotely piloted, etc.), a cargo aircraft, passenger aircraft, drone, and/or other suitable type of aircraft. The aircraft is preferably operable between a forward configuration, hover configuration, and transition configuration (e.g., between forward and hover), but can additionally or alternately be operable in a taxi (e.g., ground operation) configuration, and/or be otherwise suitably configured. An example of the forward and hover configurations is shown in FIG. 2.

Figure 3A:
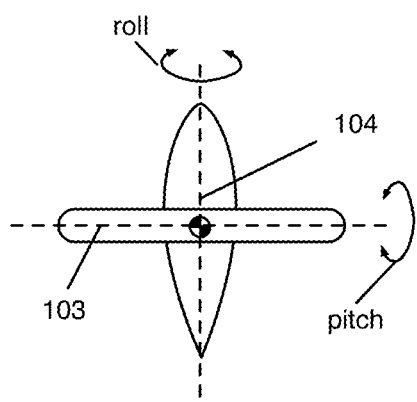
FIG. 3A and FIG. 3B are schematic representations of a variant of the system from a top view and a side view, respectively, illustrating various axes of the aircraft.
Figure 3B:
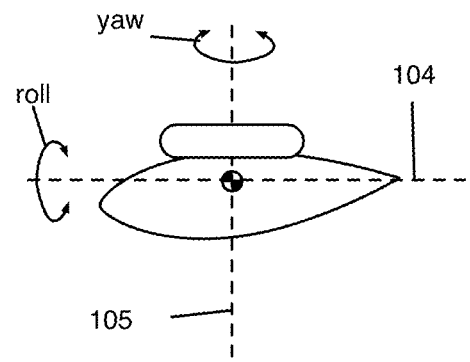
Figure 5A:
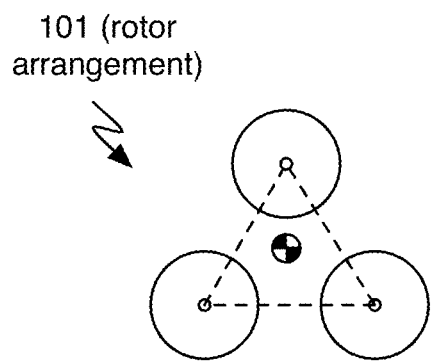
FIGS. 5A-5F are each a schematic representation a different variant of the rotor arrangement in the hover arrangement from a top view.
Figure 5B:
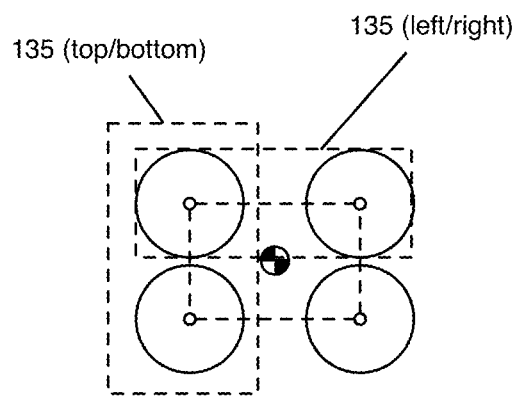
Figure 5C:
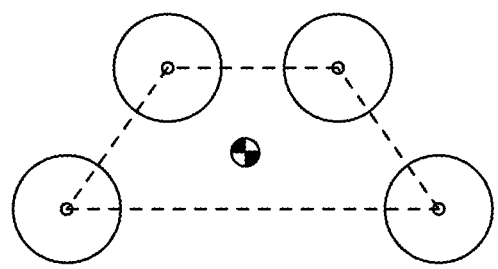
Figure 5D:
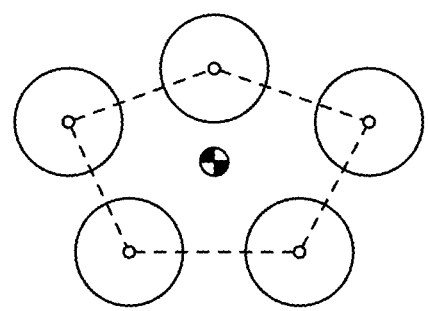
Figure 5E:
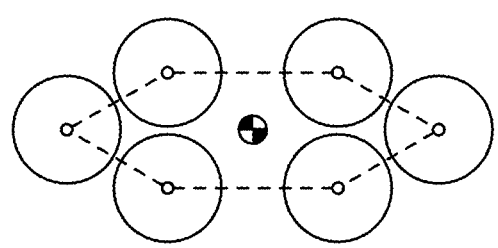
Figure 5F:
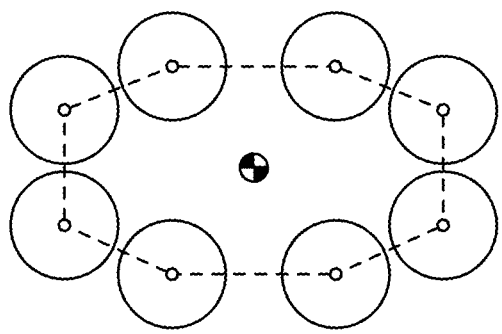

The aircraft 100 defines various geometrical features. The aircraft defines principal geometric axes, as shown in FIGS. 3A-3B, including: a vertical axis 105 (e.g., yaw axis), a longitudinal axis 104 (e.g., a roll axis), and a lateral axis 103 (e.g., a pitch axis). The vertical, longitudinal, and lateral axes can be defined such that they intersect at the center of gravity (CoG) of the aircraft 102, and a pure moment about any one of the aforementioned axes causes the aircraft 100 to rotate about the vertical, longitudinal, and lateral axes, respectively. However, the three principal axes can additionally or alternatively be defined geometrically (e.g., based on lines of symmetry of the aircraft in one or more dimensions, based on arbitrary lines through the aircraft, etc.) with or without reference to the CoG. For example, the axes can intersect at a geometric center of the aircraft. The propellers of the aircraft each define a disc area centered at the axis of rotation of the propeller, and the disc area is contained by an infinite disc plane extending away from the axis of rotation. In variations of the aircraft, the disc planes of each of the plurality of rotors can be coextensive with any suitable subset of the remainder of the plurality of propulsion assemblies. In a first example, each disc plane can be coextensive with each other disc plane in the hover configuration of a first variation. In a second example, each disc plane can be coextensive with the disc plane of one other propulsion assembly symmetrically across the longitudinal axis of the aircraft and displaced from (e.g., offset from) the disc planes of each other propulsion assembly. Propeller axes can be coaxial with motor axes and/or other propeller axes, not coaxial with motor axes and/or other propeller axes, coplanar, not coplanar, and/or otherwise suitably oriented relative to motor axes and/or other propeller axes. However, the propeller axes and/or disc planes of the plurality of propulsion assemblies can be otherwise suitably arranged relative to one another.

The aircraft 100 can operate within any suitable acoustic range. The aircraft preferably operates below a maximum dB level, but can additionally or alternately operate within different acoustic ranges in different flight configurations (e.g., forward, transition, hover, taxi), and/or be configured to operate in different acoustic ranges (e.g., such as when near human populations, urban centers, to comply with varying regulatory restrictions, etc.). Variants can utilize a large total rotor disc area relative to the width of the aircraft and/or a large rotor blade area relative to the wing area, which can reduce the acoustic profile of the aircraft. In variants, the individual rotor disc diameter is between 10% and 40% of the width of the aircraft, but can be 10%, 20%, 30%, 40%, >40%, and/or <10% of the width of the aircraft—employing a plurality of such rotors can enable an effective rotor disc diameter (e.g., single theoretical disc of the same area as the total combined rotor disc area of the individual rotors) of >40% the width of the aircraft, such as <40%, 50%, 60%, 70%, 80%, 90%, 100%, 120%, 150%, 200%, 250%, and/or >250%. Similarly, utilizing a large blade area (e.g., overall exposed surface area, blade platform area, etc.) for each individual rotor (e.g., for a given rotor disc diameter) allows for low rotor tip speeds (e.g., relative to tip speeds of a rotor of the effective rotor disc diameter, Mach 0.3), which can reduce the acoustic profile for the aircraft. The individual rotor blade area (e.g., defined as the chord integrated in the radial direction of the rotor disc and multiplied by the number of blades on the rotor, the integrated chord along the radius of a blade, or otherwise defined) and/or total rotor blade area (e.g., the sum of all the individual rotor blade areas for a rotor, for the vehicle, etc.) is preferably between 10% and 200% of the wing area, but can be <5%, 10%, 20%, 30% 50%, 75%, 100%, 150%, 200%, >200%, ranges therebetween, and/or any other suitable proportion relative to the wing area. In a specific example, the total rotor blade area can be 10 square meters. In a second specific example, the wing area can be 8 square meters and the wing span can be 10 meters. In such variants, the aircraft can be configured to operate within an acoustic range in the hover mode with a minimum dB level of: less than 30, 40, 50, 55, 60, 65, 70, 75, 80, 85, 90, 95, 100, 105, 110, or any other suitable dB level; and a maximum dB level of 40, 45, 50, 55, 60, 65, 70, 75, 80, 85, 90, 95, 100, 105, 110, 115, 120, more than 120, or any other suitable dB level. In such variants, the aircraft can be configured to operate within an appropriate acoustic range in the forward mode with a minimum dB level of: less than 10, 30, 40, 50, 55, 60, 65, 70, 75, 80, 85, 90, 95, 100, 105, 110, or any other suitable dB level; and a maximum dB level of 40, 45, 50, 55, 60, 65, 70, 75, 80, 85, 90, 95, 100, 105, 110, 115, 120, more than 120, ranges therebetween, and/or any other suitable dB level. The acoustic range can similarly be determined by transforming this acoustic range into an EPNL scale (EPNdB), A-weighted (dBA), C-weighted (dBC), Z-weighted, CNEL, NDL, SEL, SENEL, Leq, Lmax, and/or other expression of noise level, measured at a distance of 0 m, 10 m, 25 m, 50 m, 100 m, 150 m, 200 m, 300 m, 500 m, 1000 m, and/or any other appropriate proximity; alternatively, the numbers discussed above for the acoustic range can be applied to the aforementioned noise level expressions.

The aircraft 100 can have any suitable mass and/or mass limitations (e.g., unloaded mass, loaded mass, max takeoff mass, etc.). The aircraft mass can be: 0.1 kg, 0.25 kg, 0.5 kg, 0.75 kg, 1 kg, 2 kg, 3 kg, 5 kg, 10 kg, 50 kg, 200 kg, 500 kg, 1000 kg, 1250 kg, 1500 kg, 1750 kg, 2000 kg, 2250 kg, 2500 kg, 3000 kg, 3500 kg, 5000 kg, 10000 kg, 25000 kg, greater than 25000 kg, less than 0.1 kg, less than 1 kg, 1-5 kg, 5-10 kg, less than 10 kg, less than 1000 kg, less than 3500 kg, less than 10000 kg, greater than 25000 kg, and/or any other suitable mass. The cargo/payload mass capacity can be: 0.1 kg, 0.25 kg, 0.5 kg, 0.75 kg, 1 kg, 2 kg, 3 kg, 5 kg, 10 kg, 50 kg, 200 kg, 500 kg, 1000 kg, and/or any other suitable mass. The fuel and/or battery mass can be: 0.1 kg, 0.25 kg, 0.5 kg, 0.75 kg, 1 kg, 2 kg, 3 kg, 5 kg, 10 kg, 50 kg, 200 kg, 500 kg, 1000 kg, and/or any other suitable mass. The fuel and/or battery capacity can define any suitable aircraft range, which can be <1 mi, 1 mi, 5 mi, 10 mi, 20 mi, 50 mi, 100 mi, 150 mi, 200 mi, 250 mi, and/or any other suitable aircraft range.

In variants, the rotors generate lift by angling (e.g., actively, passively such as by an installation angle, etc.) the thrust axis one or more rotors of the aircraft by 5-7 degrees, generating a lift force perpendicular to the direction of incoming airstream, with a certain increase in necessary power to maintain the same thrust. The ratio of lift force multiplied by forward velocity to the power needed to maintain 0 forward thrust is the L/De (lift over equivalent drag) efficiency merit—this can be on the order of 20 for structurally support and/or transform aerodynamic aircraft components (e.g., rotors, wings, control surfaces, etc.). The airframe can optionally provide attachment points to modular component attachment, such as payload housing attachment. The aircraft can include one or more airframes. Each airframe preferably includes a support structure, but can additionally or alternatively include any other suitable component. The support structure can include a set of support members, and can function to mount the set of rotors (e.g., between the forward and hover modes), the modular components, the tilt mechanism(s), and/or any other suitable component.

Figure 7:
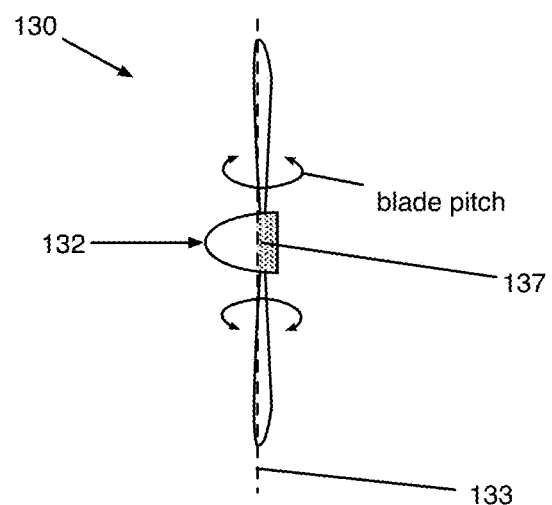
FIG. 7 is a side view representation of a variant of a rotor.

The rotors of the aircraft 100, in variants, function to provide thrust (e.g., force aligned with direction of motion, force propelling aircraft in direction of motion) and/or lift (e.g., force opposing gravity, force orthogonal to thrust, etc.). The rotors preferably provide lift to sustain flight of the aircraft which is equal to or greater than the aircraft weight in all flight configurations, however the rotors can additionally or alternately provide a portion of the required lift in the flight configurations, including forward (and/or transition) configurations (e.g., in conjunction with a set of wings). An example rotor is shown in FIG. 7. The rotors can provide, individually or collectively: 300%, 200%, 150%, 120%, 110%, 95%, 90%, 75%, 50%, 40%, 30%, 20%, 10%, 5%, more or less than the aforementioned percentages, or any suitable proportion of the lift required to maintain aircraft altitude during forward flight or the total lift generated by the aircraft during flight. The rotors can additionally or alternatively provide, individually or collectively: 500%, 250%, 150%, 120%, 110%, 95%, 90%, 75%, 50%, 40%, 30%, 20%, 10%, 5%, or any suitable proportion of the force required to propel the aircraft during forward flight, liftoff (e.g., takeoff), transitional operation, and/or any other suitable operation mode. The rotors can additionally or alternatively provide, individually or collectively: 300%, 150%, 120%, 110%, 95%, 90%, 75%, 50%, 40%, 30%, 20%, 10%, 5%, or any suitable proportion of the lift and/or thrust required to propel the aircraft during hover flight.

Figure 13A:
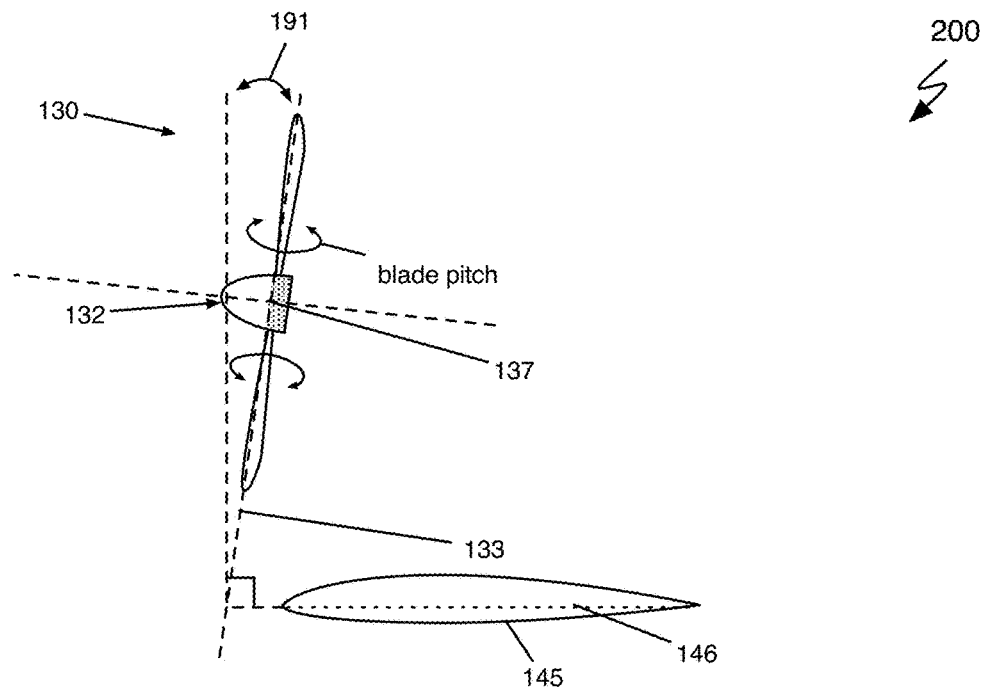
FIGS. 13A-C are schematic representations of a variant of the rotor disc angle of attack relative to a wing in a forward configuration, transition configuration, and hover configuration, respectively.
Figure 13B:
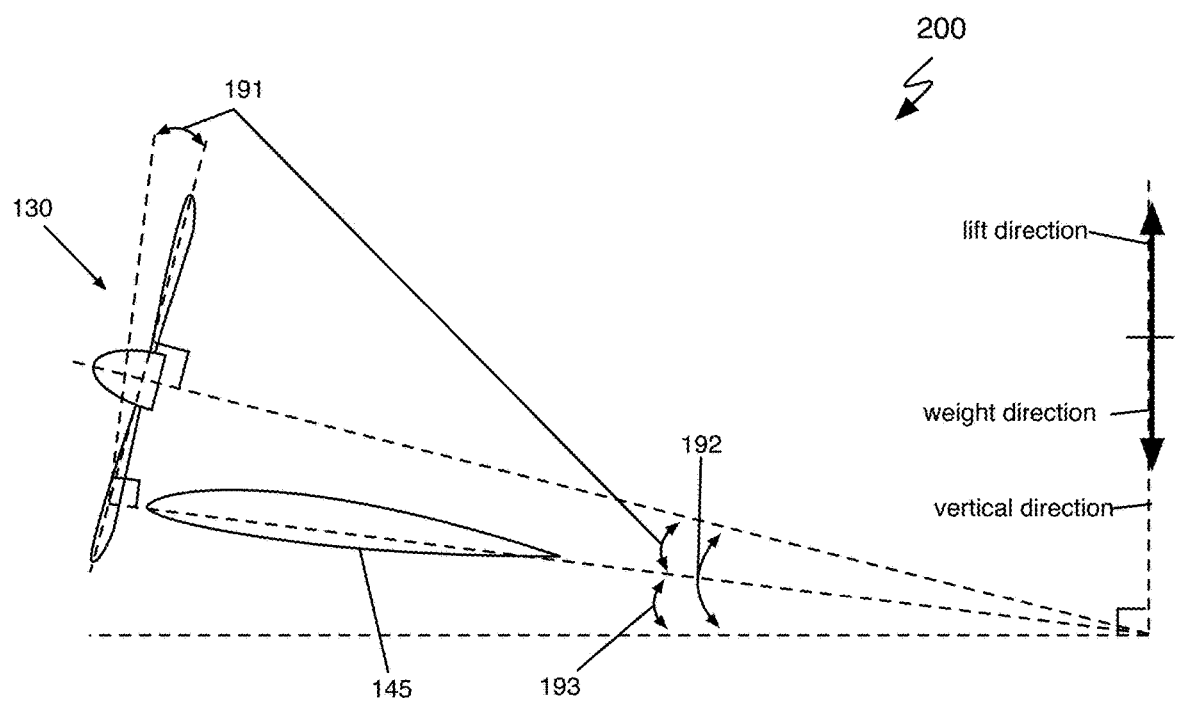
Figure 13C:
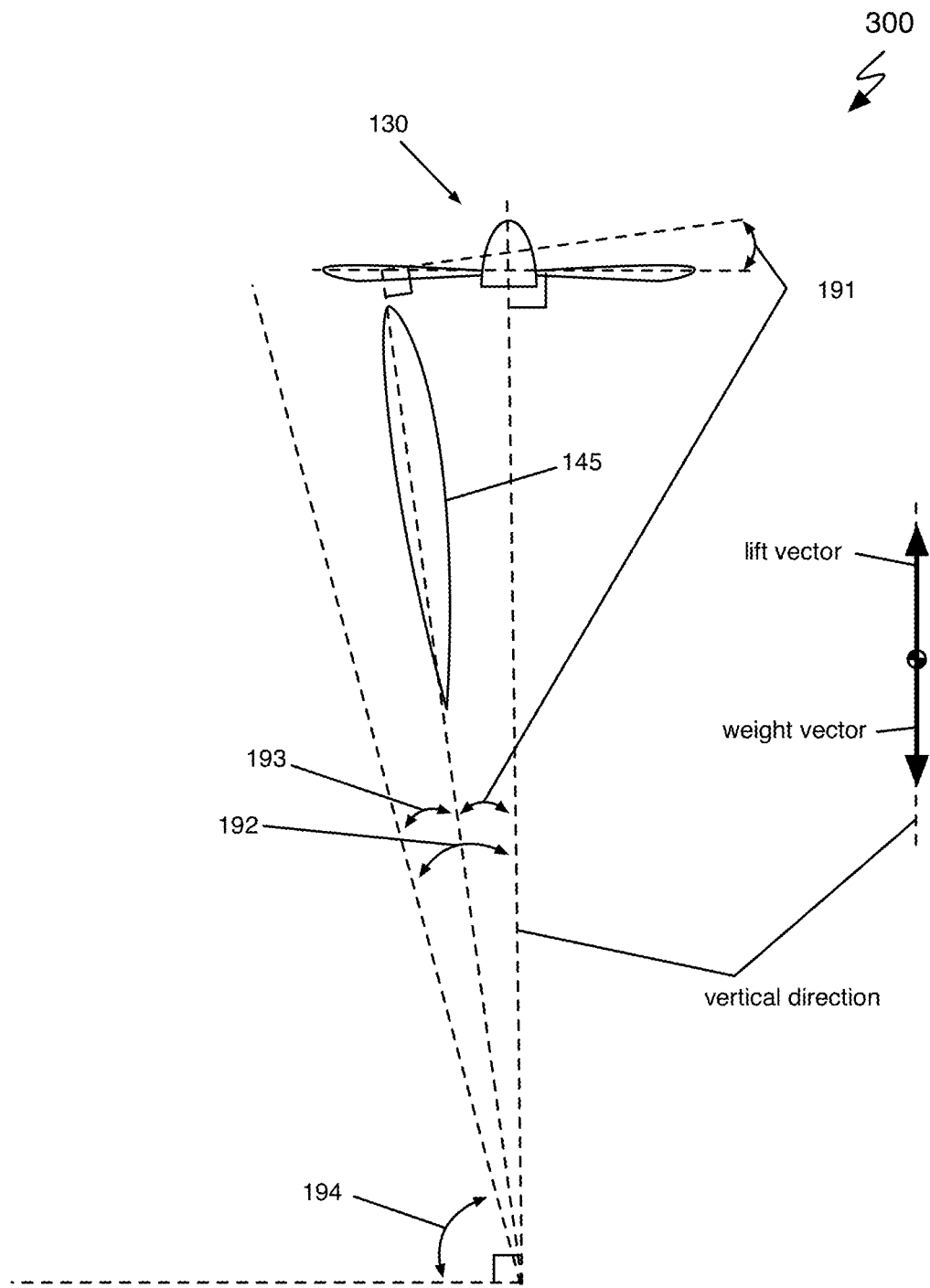
Figure 14A:
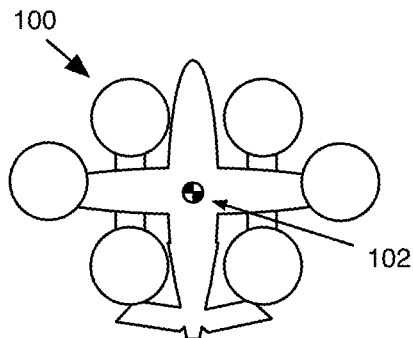
FIGS. 14A, 14B, and 14C are a top view schematic representation of a variant of the aircraft in a hover configuration, a top view schematic representation of the variant in a forward configuration, and a side view schematic representation of the variant in a hover configuration, respectively.
Figure 14B:
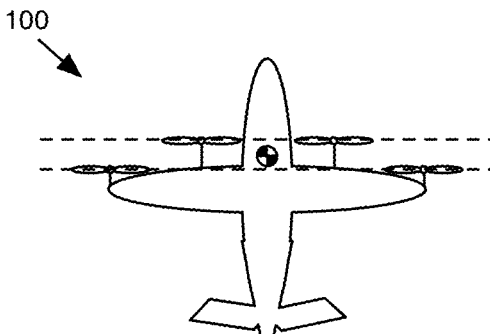
Figure 14C:
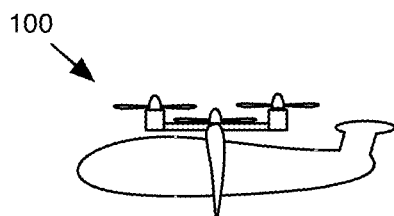

The rotors can provide lift associated with an angle of attack of the rotor disc relative to: the incoming airstream during forward flight, longitudinal axis of the aircraft, wing of the aircraft (e.g., the chord line 146 of the wing cross section), and/or other reference axis or plane. The angle of attack of the rotor disc relative to the wing (e.g., chord line 146 of the wing) can be <0 deg, 0 deg, 1 deg, 3 deg, 5 deg, 7 deg, 9 deg, 11 deg, 13 deg, 15 deg, any range bounded by the aforementioned values, and/or any other suitable angle. An example of the angle of attack of the rotor disc relative to the wing 191 is illustrated in FIG. 13A. The angle of attack of the rotor disc can be <0 deg, 0 deg, 1 deg, 3 deg, 5 deg, 7 deg, 9 deg, 11 deg, 13 deg, 15 deg, 17 deg, 20 deg, >20 deg, any range bounded by the aforementioned values, and/or any other suitable angle. An example of the angle of attack of the rotor disc 192 is illustrated in FIG. 13B. The rotor disc angle of attack (relative to the wing or otherwise) can be defined (e.g., measured) relative to the rotor axis of rotation, motor axis of rotation, a vector orthogonal to the rotor disc plane 133, and/or any other suitable reference. The angle of attack of the rotor preferably transforms based on the transformation of the tilt mechanism and/or pitch of the aircraft. Preferably, the rotor disc planes are substantially parallel to the lateral/longitudinal plane (pitch/roll plane) in the hover configuration, and angled relative to the vertical/lateral plane (yaw/pitch plane) in the forward configuration (and/or hover configuration). Accordingly, the tilt mechanism preferably transforms the wing by 90 degrees less the rotor disc angle of attack while transitioning between the forward and hover configurations (an example is illustrated in FIG. 13C), however the tilt mechanism can transform the wing by 90 degrees plus the rotor disc angle of attack while transitioning between the forward and hover configurations, exactly 90 degrees between the forward and hover configurations, and/or any other suitable transformation angle. In a specific variant, the transformation between forward and hover can include tilting past vertical (e.g., creating a rearward thrust vector) in order to arrest forward motion of the vehicle.

Each rotor preferably includes a hub, which couples the rotor blades 136 to the propulsion system. The propulsion system can be rigidly coupled to the airframe (e.g., wing) structure and/or a nacelle, or can be coupled via a rotor tilt mechanism or articulated linkage configured to transform the rotor relative to the wing, change the angle of attack, and/or change a side cant angle relative to the wing. The propulsion system is preferably an electric motor (e.g., capable of 70 kW continuous power), which can be integrated in to the hub or separate and distinct from the hub. Alternately, the propulsion system can be an internal combustion engine (ICE), turbine engine, a hybrid-electric engine, and/or any other suitable propulsion system. In variants, one or more rotors can be coupled and/or linked to the same propulsion system via shafts, rotational couplings, cross-linkages, and/or other suitable mechanisms. The hub preferably defines the axis of rotation of the rotor. In a specific example, the aircraft can include a plurality of propulsion assemblies, each propulsion assembly including: an electric motor and a propeller rotatably coupled to the electric motor about an axis of rotation. In a second specific example, the hub can be located at the geometric center of the rotor and/or define the geometric center of the rotor.

Each rotor can include a set of rotor blades 136, which function to generate an aerodynamic force as they are rotated through a fluid (e.g., air), which can be used to propel the aircraft. Each rotor can include any suitable number of rotor blades. Preferably, each rotor includes 5 rotor blades, but can alternately include 2, 3, 4, 6, or more than six rotor blades for each rotor. The rotor blades can have any suitable blade cross section and/or aerodynamic profile. In a first specific example, the rotor blades are the rotary airfoil blades described in U.S. application Ser. No. 16/708,280, filed 9 Dec. 2019, which is incorporated in its entirety by this reference. However, the rotor blades can be otherwise configured.

The rotor blades can define any appropriate spanwise geometry. Preferably, the upper surface of the rotor blades is generally in a vesica piscis geometry, but can additionally or alternately be tapered toward the tip (e.g., decreasing rotary airfoil chord length across the end portion of the blade), have constant cross sectional area, have variable cross sectional area, and/or have any other appropriate geometry. The taper angle can be the same or different on the leading edge, the trailing edge of the airfoil, on an inner portion of the rotary airfoil, and/or at the tip. The tip of the rotary airfoil can have any appropriate geometry. The tip can be flat, rounded, or pointed, and can be a point, edge, face, and/or other appropriate geometry. The rotary airfoil can have any appropriate tip angle. The blade tip can be anhedral, dihedral, un-angled, and/or at any suitable angle. The rotary airfoil can have any appropriate twist angle. The twist angle preferably changes the effective blade angle of attack along the span of the rotary airfoil. The blade twist angle is preferably defined between the innermost and outer (tip) cross sections, but can be defined between any two cross sections, a section of the blade, and/or at any suitable angle.

The rotor blades can have any appropriate angular spacing about the axis of rotation. Preferably, the rotor blades are evenly spaced about the axis of rotation, but can alternately be spaced unevenly about the axis of rotation (e.g., for sound mitigation). In a first specific example, the rotor blades are spaces about the axis of rotation as described in U.S. application Ser. No. 16/430,163, filed 3 Jun. 2019, which is incorporated in its entirety by this reference. However, the rotor blades can be otherwise arranged.

The rotor blades can define a span of any appropriate length (e.g., blade length). The span can be sized relative to a cross sectional chord length (L), independent of the chord length, and/or any appropriate length. The span can be: 1 L, 5 L, 10 L, 15 L, 20 L, 25 L, 50 L, <5 L, 5-25 L, 25-50 L, >50 L, <5 cm, 5 cm, 10 cm, 25 cm, 30 cm, 35 cm, 40 cm, 45 cm, 50 cm, 60 cm, 70 cm, 80 cm, 90 cm, 1 m, 1.25 m, 1.5 m, 1.75 m, 2.5 m, 5 m, 10 m, 15 m, 20 m, 5-25 cm, 25-50 cm, 50-100 cm, 0.1 m-15 m, 1-2 m, 1-4 m, 5-10 m, 10-20 m, >20 m, and/or any other suitable length. In a specific example, the rotor blades define a rotor disc diameter of 3 meters.

Separate rotors on the aircraft preferably operate with the same rotor blades in the same configuration, but can alternately include a different: number of rotor blades, rotor blade length (or radius of rotor disc), rotor blade spacing, rotor blade cross section, and/or other different characteristic.

The rotors can include a blade pitching mechanism 137, which functions to change the angle of attack of the rotor blade (e.g., relative to the fluid flow). The rotor can include a single pitching mechanism, or multiple pitching mechanisms associated with each rotor such as: one per rotor, multiple per rotor, one per blade, and/or any other suitable number of blade pitching mechanisms per rotor. The pitching mechanism can actuate blades independently or actuate multiple simultaneously. The pitching mechanism can be: integrated into the rotor hub, connected/mounted to the rotor hub, and/or separate from the rotor hub. Preferably, the pitching mechanism can be electromechanically actuated, but can additionally or alternately be hydraulic, pneumatic, and/or ground adjustable (by a human operator or other input). The pitching mechanism can be operable between a finite or infinite number of positions. The pitching mechanism can be: a controllable-pitch propeller (CPP), a swashplate, a ground adjustable rotor, and/or other pitching mechanism. In a first variant, the blade pitch mechanism is a swashplate. In a second variant, the blade pitching mechanism is a set of electromechanical actuators. In a third variant, the rotor does not include a pitching mechanism and the lift generated by the rotors is controlled by varying the RPM.

The rotors can include a nacelle 138, which functions as the structural mounting for the rotors. Nacelles can additionally function as packaging for one or more propulsion components (e.g., motor, engine, etc.) and/or power sources. The nacelles are preferably an aerodynamically efficient shape (e.g., teardrop), which tapers toward a trailing portion of the nacelle in the forward configuration. The nacelles preferably serve as a support member node connecting the rotor to the airframe, and can be connected to 1, 2, 3, or more than 3 support members. In a first variant, a nacelle can be connected to the endpoint of a support member. In a second variant, a nacelle can bisect a support member. In a third variant, a nacelle can be directly integrated into a support member and/or a support member can be directly integrated into the nacelle (e.g., landing gear strut, ground support member, etc.). Nacelles are preferably fixed relative to the lateral support members (and/or wing or other mounting component), but alternately can rotate, slide, or otherwise actuate relative to the wing and/or the tilt mechanism. In a specific example, nacelles are mounted at the outboard termination of a lateral support member (e.g., left wing and/or right wing, outboard end of a wing) and the vertical termination (e.g., upper end and/or lower end) of an anti-lateral support member. In a second specific example, the nacelles can be mounted to the leading edge or side of the support members, proximal a wing extremity (e.g., wing end). However, the nacelles can have any other suitable set of features and/or arrangement.

In variants, a subset of the rotors (e.g., all rotors, rotors closest to the ground in the forward configuration, rear rotors, etc.) can be retracted and/or captive within the nacelle in one or more configurations, and actuated by the blade pitch mechanism and/or a retraction mechanism. In a first example, the rotors closest to the ground retract during or after a fixed-wing style landing to protect the rotors and/or protect humans from exposed blades.

The rotors are preferably unenclosed (e.g., without captive blade tips, without an inflow screen, without a fan duct, etc.), but in additional or alternative variations can be enclosed (e.g., ducted as in a ducted fan, enclosed within a cowling about the perimeter of the disc area, etc.) and/or include a fixed screen in the inflow and/or outflow path. Rotor enclosures/ducting can be connected to the nacelle and/or otherwise mounted to the airframe.

Figure 15A:
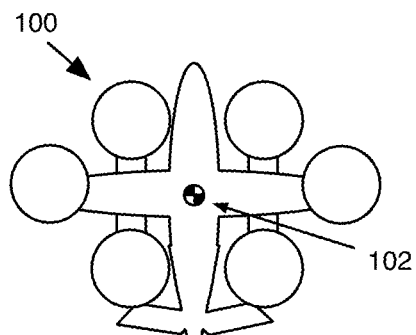
FIGS. 15A, 15B, and 15C are a top view schematic representation of a variant of the aircraft in a hover configuration, a top view schematic representation of the variant in a forward configuration, and a side view schematic representation of the variant in a hover configuration, respectively.
Figure 15B:
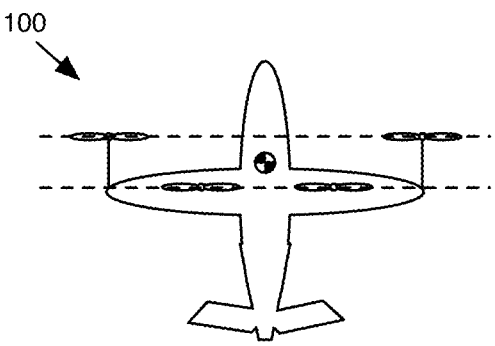
Figure 15C:
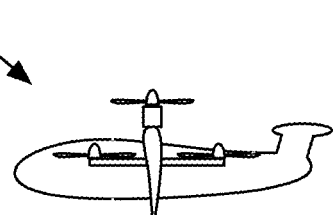
Figure 16A:
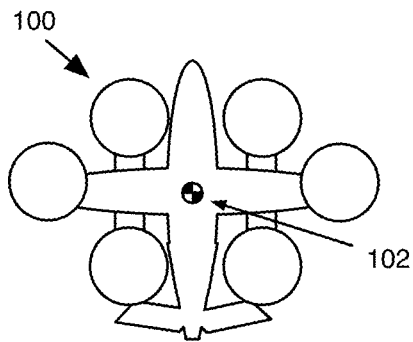
FIGS. 16A, 16B, and 16C are a top view schematic representation of a variant of the aircraft in a hover configuration, a top view schematic representation of the variant in a forward configuration, and a side view schematic representation of the variant in a hover configuration, respectively.
Figure 16B:
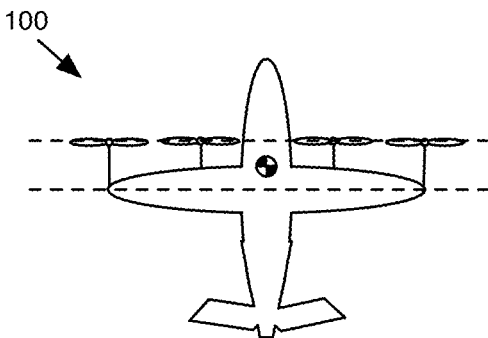
Figure 16C:
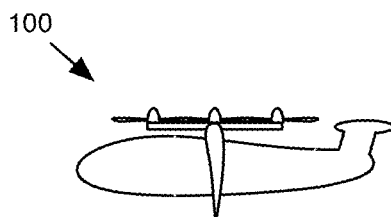
Figure 17A:
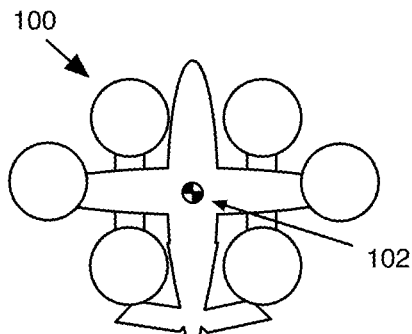
FIGS. 17A, 17B, and 17C are a top view schematic representation of a variant of the aircraft in a hover configuration, a top view schematic representation of the variant in a forward configuration, and a side view schematic representation of the variant in a hover configuration, respectively.
Figure 17B:
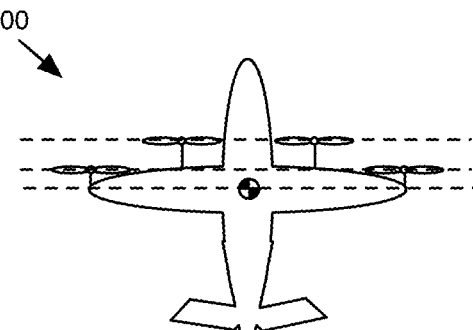
Figure 17C:
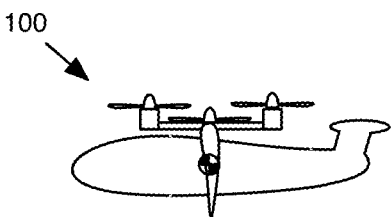
Figure 18A:
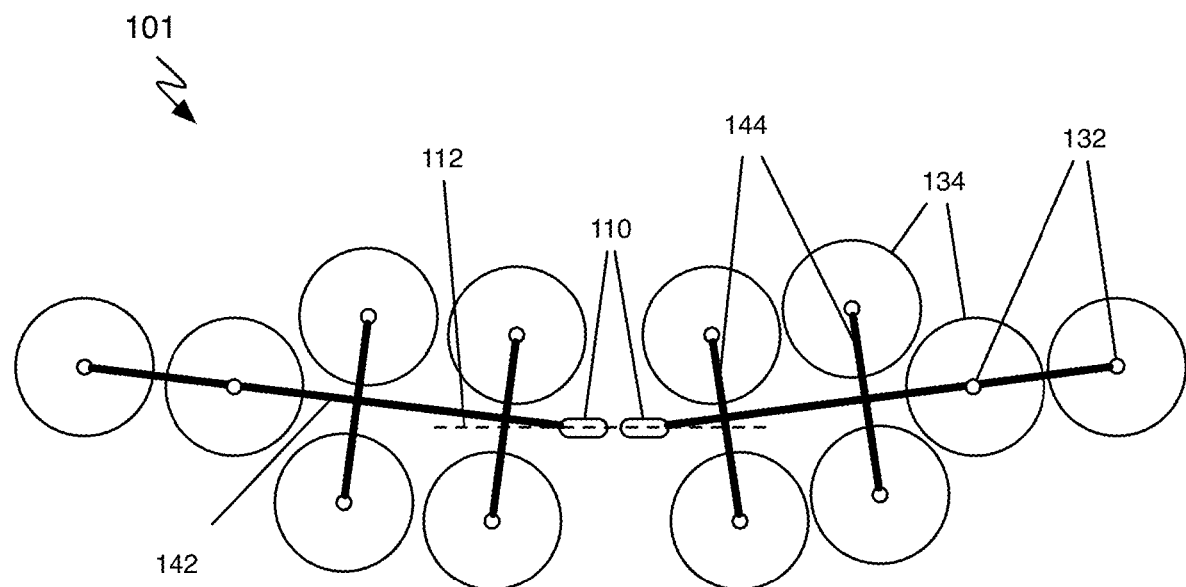
FIG. 18A-F are front view schematic representations of a variant of the aircraft which include dihedral wings.
Figure 18B:
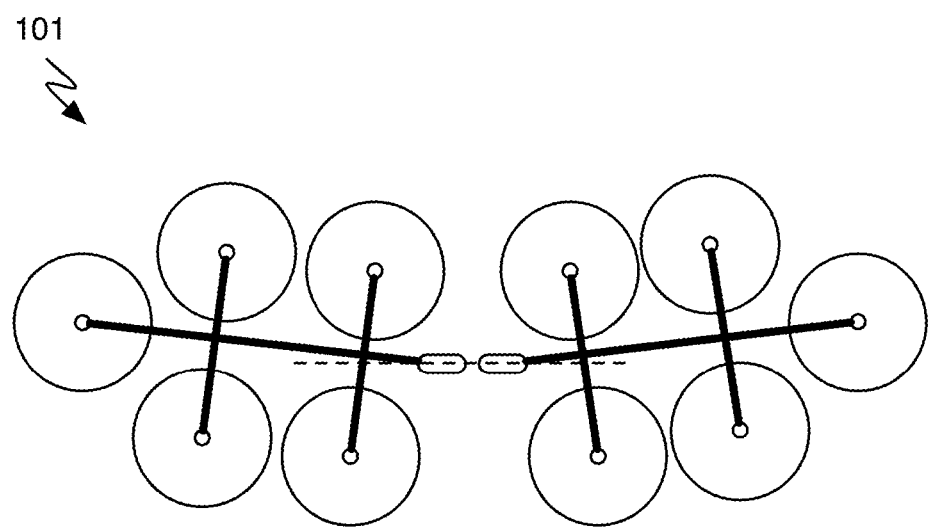
Figure 18C:
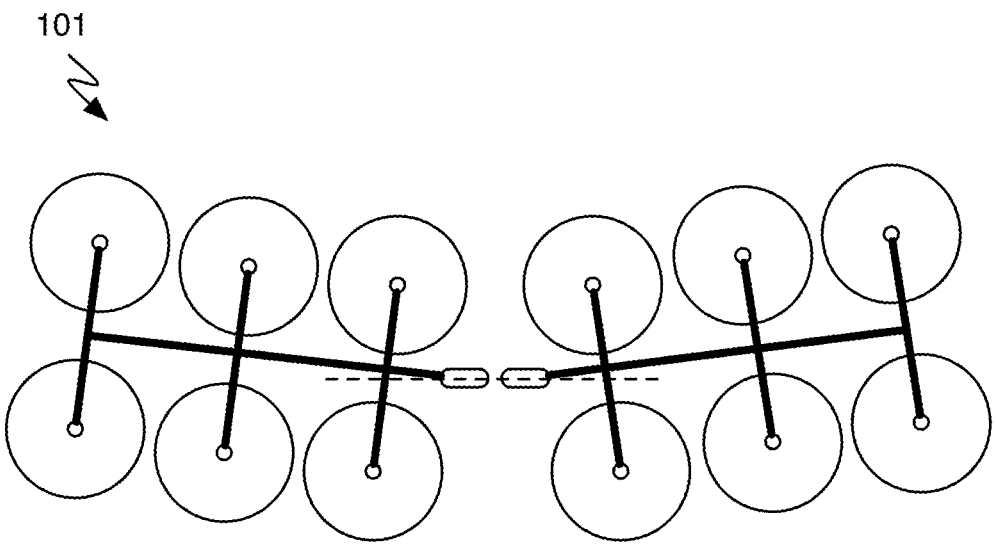
Figure 18D:
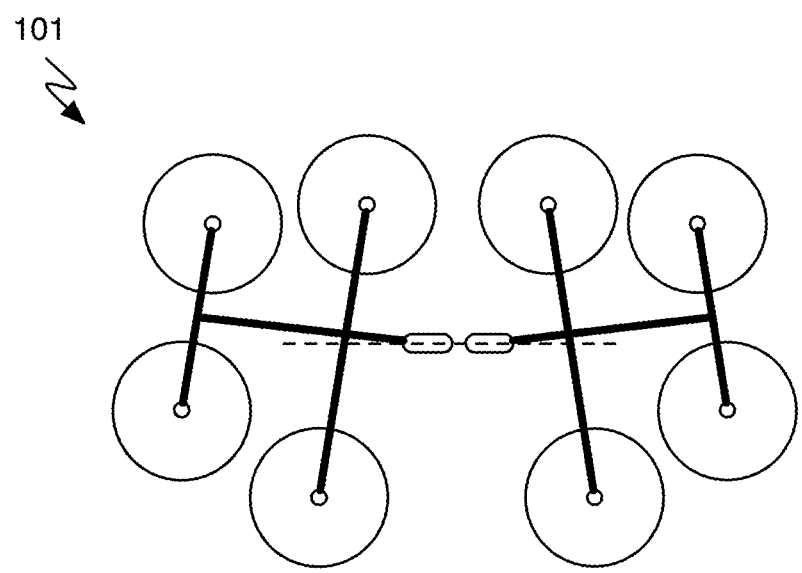
Figure 18E:
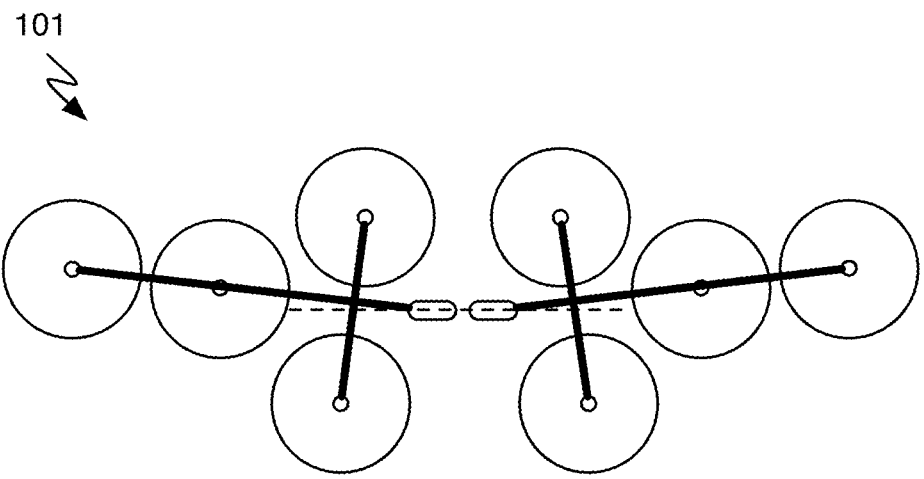
Figure 18F:
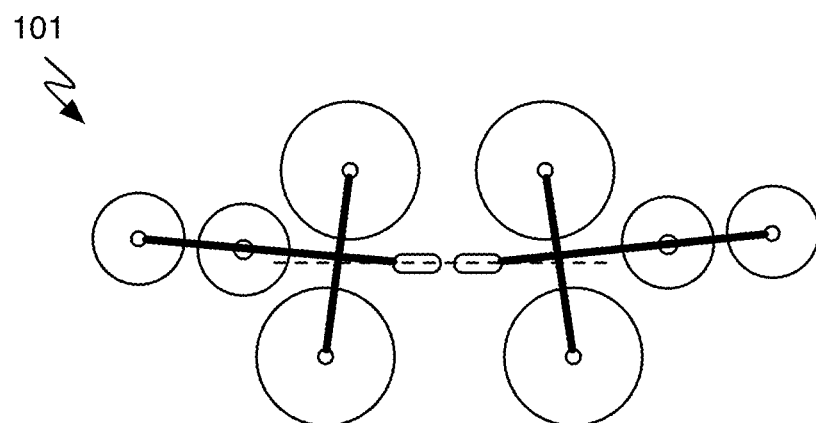
Figure 19A:
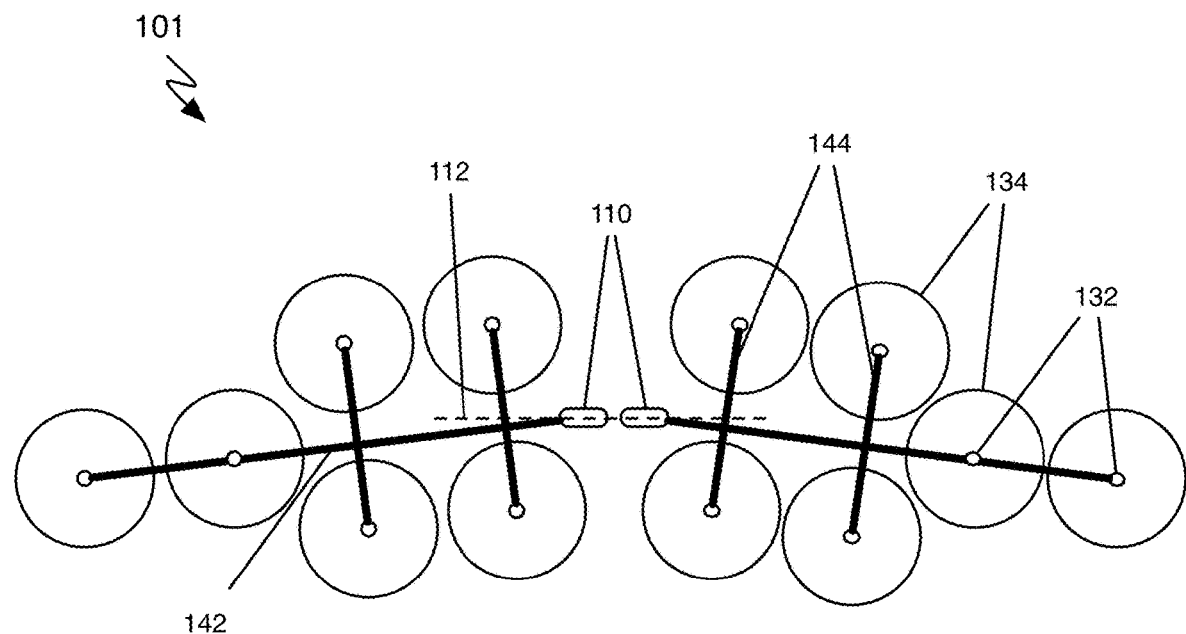
FIG. 19A-F are front view schematic representations of a variant of the aircraft which include anhedral wings.
Figure 19B:
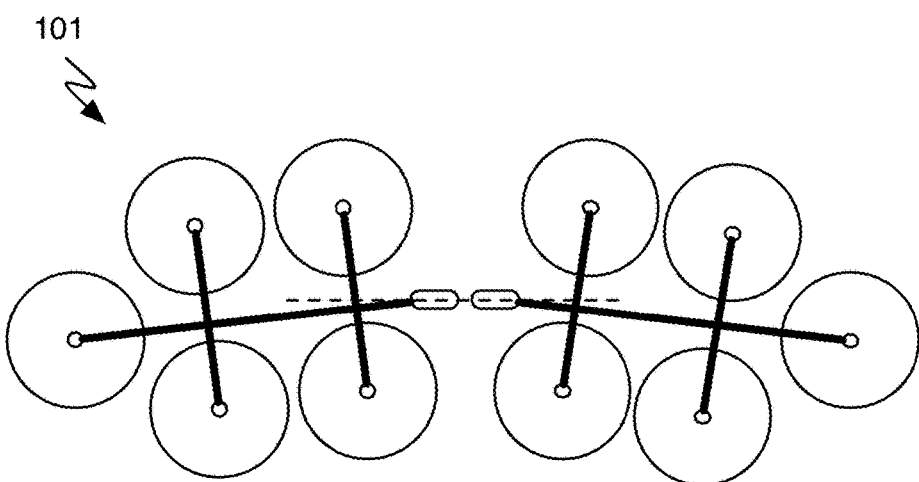
Figure 19C:
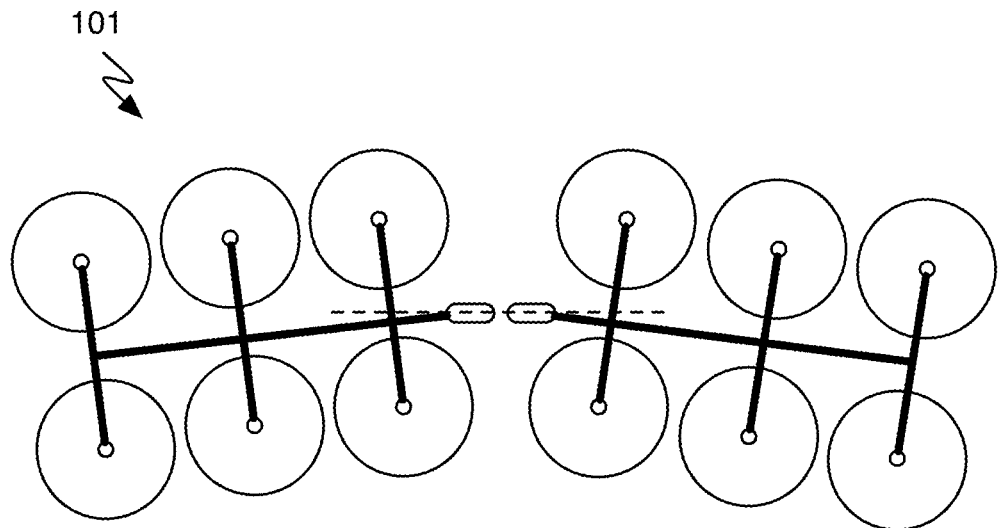
Figure 19D:
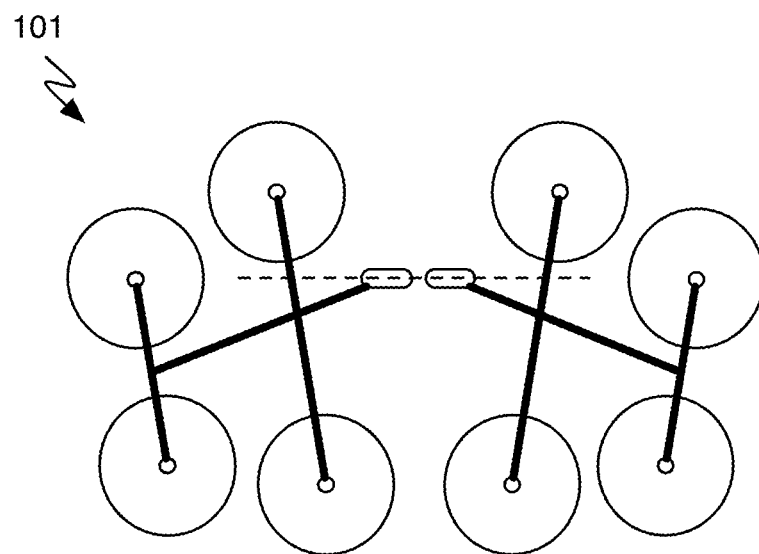
Figure 19E:
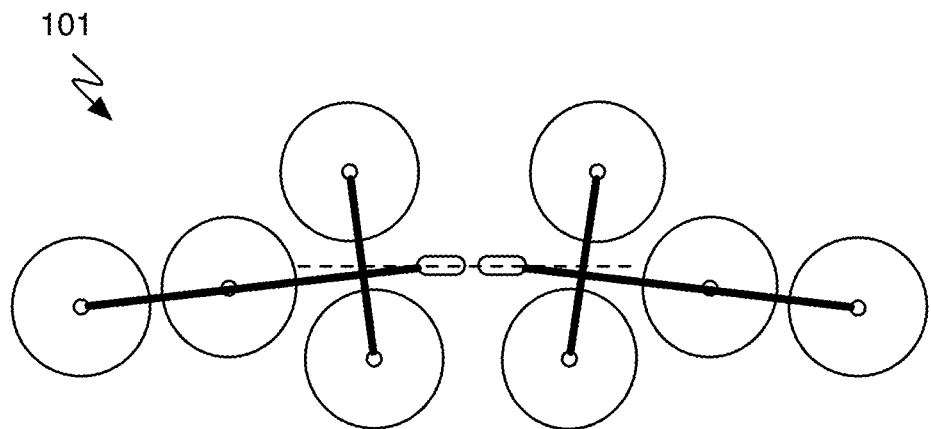
Figure 19F:
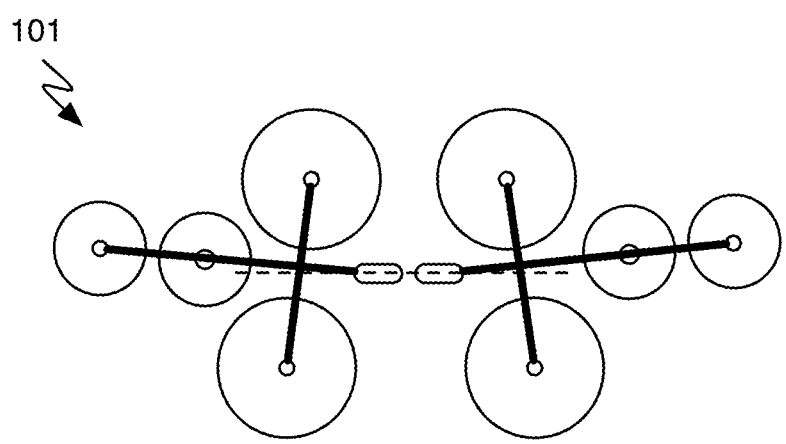
Figure 20A:
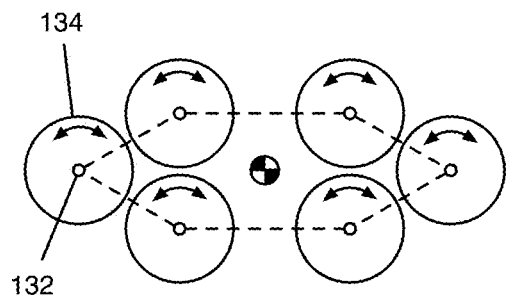
FIGS. 20A-D are schematic representations of example rotor rotation directions.
Figure 20B:
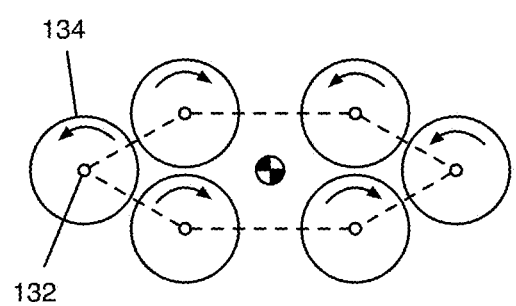
Figure 20C:
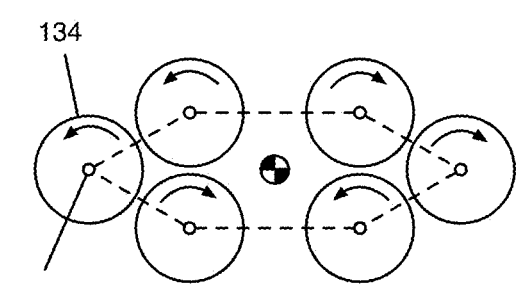
Figure 20D:
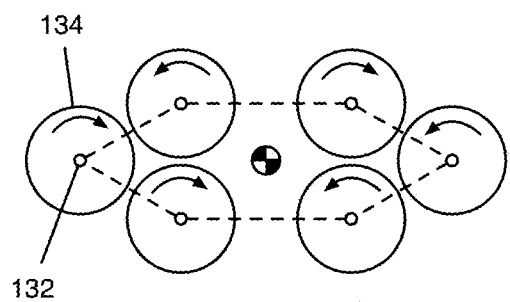

The set of rotors can have any suitable arrangement on the aircraft and/or airframe. Rotors can be evenly or unevenly spatially distributed relative to an axis of the aircraft, but can additionally or alternatively be evenly or unevenly distributed relative to (e.g., about): the aircraft mass (e.g., about center of gravity), lift generation axes, aircraft geometry (e.g., an aircraft geometric center), airframe geometry (e.g., an airframe geometric center), and/or otherwise distributed or arranged. The rotors are preferably symmetric about a lateral plane of the aircraft and/or airframe, but can additionally or alternatively be asymmetric about the lateral plane. The rotors within the set can be: coplanar, offset (e.g., vertically, laterally, longitudinally, angled, etc.), or otherwise arranged relative to other rotors in the set. In an example, rotors are evenly distributed on a left and a right side relative to the longitudinal axis of the aircraft or airframe, but can be otherwise configured. Rotors, hubs, rotor disc planes (and/or swept area), and/or other suitable rotor references can be: coplanar, offset from each other (e.g., in parallel planes), skewed (e.g., propeller axes can be skewed relative to one another), and/or otherwise configured in the forward, hover, transition, and/or other operation mode. In a first variant, distal (outboard) rotors are recessed (arranged backwards, offset toward the aircraft rear in the forward configuration) from proximal (inboard) rotors, examples of which is shown in FIGS. 14A-C and FIG. 17A-C. In a second variant, proximal (inboard) rotors are recessed (arranged backwards, offset toward the aircraft rear in the forward configuration) from distal (outboard) rotors, an example of which is shown in FIGS. 15A-C. In a third variant, inboard and outboard rotor disc planes are coplanar, an example of which is shown in FIGS. 16A-C.

The rotors can have any suitable arrangement relative to the tilt axis 112 and/or CoG in one or more modes of operation. One or more rotors (e.g., rotor hubs) can be: forward of the tilt axis, rearward of the tilt axis, above the tilt axis, below the tilt axis, arranged along the tilt axis, and/or otherwise suitably arranged relative to the tilt axis in the forward and/or hover configuration. One or more rotors (e.g., rotor hubs) can be: forward of the CoG, rearward of the CoG, above the CoG, below the CoG, arranged along the lateral axis, and/or otherwise suitably arranged relative to the CoG in the forward and/or hover configuration. In a first example, a set of rotors (and/or corresponding rotor hubs) is arranged below the tilt axis and/or CoG (e.g., relative to a vertical direction) in the forward configuration and above the tilt axis and/or CoG in the hover configuration. In a second example, a set of rotors (and/or corresponding rotor hubs) is arranged forward of the tilt axis and/or CoG in the forward configuration and rearward of the tilt axis and/or CoG in the hover configuration.

The rotors can have any suitable arrangement relative to the wing. Rotors can be forward of the wing, rearward of the wing, above of the wing, below of the wing, arranged on an inboard portion of the wing, arranged on an outboard portion of the wing, within a boundary projection of the wing (e.g., wing functioning as a fan duct, etc.), and/or otherwise suitably arranged relative to the wing in the forward and/or hover configurations. The rotors can have any suitable arrangement relative to the payload housing or fuselage. Rotors (and/or rotor hubs) can be above, below, forward, rearward, and/or within a side view boundary projection of the payload housing or fuselage.

The set of rotors can define one or more rotor pairs, where rotors within each pair are arranged (e.g., entirely arranged, mostly arranged) on opposing sides of one or more axis of the aircraft (e.g., top/bottom rotor pair, left/right rotor pair, front/back rotor pair) in the hover configuration and/or forward configuration. The aircraft can include any suitable number of rotor pairs. The aircraft can include: 2, 3, 4, or more than 4 pairs of rotors. In a specific example, the aircraft includes three rotors per side: three left rotors and three right rotors. However, rotor pairs can be otherwise defined, and rotors can be otherwise grouped. Examples of airframes including additional top/bottom and/or left/right rotor pairs are shown in FIGS. 18A-F and FIG. 19A-F.

In the forward configuration, the set of rotors preferably includes one rotor pair above and one rotor pair below the center of gravity (CoG) of the aircraft (and/or airframe or aircraft geometric center), but can additionally or alternately include: more than one rotor pair above and/or below the CoG and/or airframe or aircraft geometric center (e.g., 2 above and 1 below, 2 above and 2 below), no rotor pairs above the CoG and/or airframe or aircraft geometric center, no rotor pairs below the CoG and/or airframe or aircraft geometric center, or be otherwise arranged. Preferably, one rotor pair is centrally aligned with the CoG in the forward configuration (e.g., for a maximally loaded aircraft, for an unloaded aircraft, within a specified range of CoGs) in a vertical direction. Additionally or alternatively, the aircraft can include multiple rotor pairs aligned with the CoG, one rotor pair forward and one rotor pair of the lateral axis (e.g., the lateral axis intersecting the CoG), one rotor of the rotor pair forward and one rotor of the rotor pair rearward of the lateral axis (e.g., the lateral axis intersecting the CoG), and/or the aircraft can otherwise be suitably configured.

In a first specific example, the rotor hub and/or the lowest point of the rotor disc associated with a rotor mounted to the end of an anti-lateral support member extends below the base of the payload housing (e.g., cabin, fuselage, etc.) and/or extends below the landing gear (e.g., location of landing gear in forward configuration, lowest point of landing gear in landing configuration, etc.).

In the hover configuration, all rotor pairs preferably lie vertically above the CoG (loaded and/or unloaded) and/or aircraft geometric center, but additionally or alternatively one or more rotors or rotor pairs can be arranged vertically below the CoG and/or aircraft geometric center. In the hover configuration, one rotor pair is preferably centrally aligned with the CoG and/or airframe or aircraft geometric center in a longitudinal or vertical direction, but additionally or alternately: more than one rotor pair can be centrally aligned with the CoG and/or airframe or aircraft geometric center in a longitudinal or vertical direction, at least one rotor pair can be forward and at least one rotor pair can be rearward of the CoG and/or airframe or aircraft geometric center, one rotor of a rotor pair can be forward and one rotor of the rotor pair can be rearward of the lateral axis (e.g., the lateral axis intersecting the CoG or a geometric center) and/or rotors/rotor pairs can be otherwise arranged. However, the aircraft can be otherwise suitably configured.

The set of rotors can include one or more unpaired rotors (e.g., for odd numbers of rotors: 3, 5, 7, etc.). Unpaired rotors can be: centrally located relative to the tilt mechanism (e.g., lying in the in the sagittal plane defined by the longitudinal and vertical axes), located on the nose of the aircraft, located on a tail/trailing portion of the aircraft, and/or otherwise suitably located.

Preferably, in the forward configuration, all rotors and/or rotor pairs are arranged longitudinally forward of the tilt axis of the tilt mechanism, but alternately one or more rotors and/or rotor pairs lie behind the tilt axis. Preferably, in the hover configuration all rotors and/or rotor pairs are arranged vertically above the tilt axis of the tilt mechanism, but alternately one or more rotors and/or rotor pairs lie below the tilt axis. In a specific example, the tilt axis of the tilt mechanism lies above (along vertical axis) and behind (along longitudinal axis) the CoG of the aircraft.

In a first specific example: in horizontal (e.g., forward) flight, the combined aerodynamic center of lift of all rotors (and/or rotor pairs) and/or airframe (e.g., including: wings, lift generated by the payload housing geometry, etc.) is substantially longitudinally aligned with the CoG of the aircraft (e.g., passing through the CoG; forming an angle of 0 deg, <1 deg, <2 deg, <3 deg, <5 deg, <10 deg, and/or any other suitable angle with the gravity axis or vertical axis; longitudinally offset from the CoG by an offset distance; etc.). In a second specific example, a rear set of rotors connected to a tail of a payload housing (or payload housing pod) lie rearward of the tilt axis.

Figure 6A:
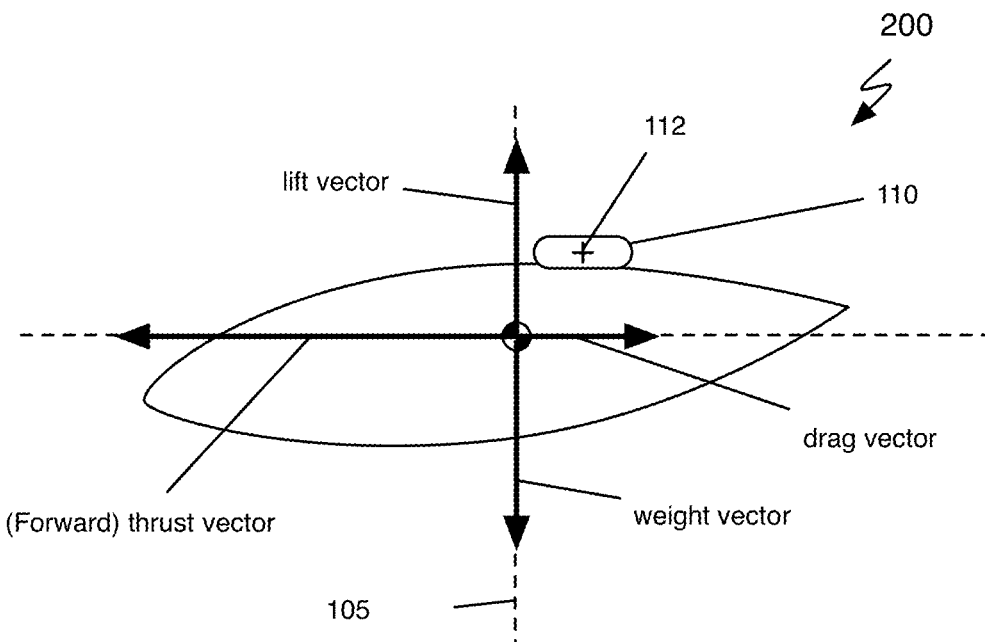
FIG. 6A is a side view schematic representation of a variant of the aircraft in the forward arrangement with the lift vector axis aligned to the weight vector and with the forward thrust vector axis aligned to the drag vector.
Figure 6B:
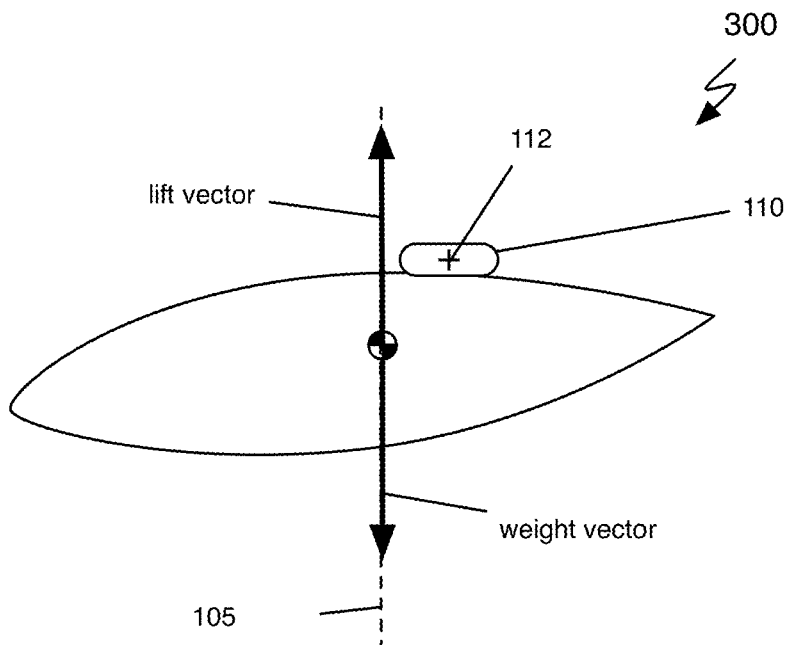
FIG. 6B is a side view schematic representation of a variant of the aircraft in the hover arrangement with the lift vector axis aligned to the weight vector.

The rotors can define any appropriate thrust vector and/or lift vector with any suitable relationship to a drag vector and/or weight vector for the aircraft in any mode of flight and/or configuration of the aircraft. Preferably, in the forward configuration (e.g., during horizontal flight), the forward thrust vector is substantially aligned with the drag axis and the lift vector is substantially aligned with the weight vector (an example is shown in FIG. 6A), however the lift and/or forward thrust vectors can alternately be offset, skewed and/or otherwise oriented relative to the weight and/or drag vectors, respectively. In the hover configuration, the lift vector (or vertical thrust) vector is substantially aligned with the weight vector (an example is shown in FIG. 6B), but can alternately be offset, skewed, and/or otherwise oriented relative to the weight vector. In a specific example, the tilt axis is offset from the center of lift and/or thrust and is arranged outside of the cabin area, while still providing a thrust vector that is substantially aligned with the drag vector in forward flight and a lift vector that is substantially aligned with the CoG in hover. In a second specific example, a line extending from the CoG through the tilt axis in the vertical/longitudinal plane defines a 45 degree angle relative to the vertical and/or longitudinal axis. In a third specific example, the tilt axis can be arranged at a non-zero angle (e.g., 45 degrees) behind and above (and/or forward and below) the center of gravity, such that the average center of thrust of all rotors can still be aligned with the center of gravity in both hover and forward flight.

The rotors can rotate clockwise, counterclockwise, or a combination thereof (e.g., wherein a subset of the rotors rotate clockwise and a remainder rotate counterclockwise). In operation, the rotors can rotate in the rotor's respective rotation direction at all times, switch rotation directions (e.g., based on the aircraft configuration, aircraft rotation or navigation, etc.), cease rotation, and/or otherwise operate. Half of the rotors preferably rotate in one direction, while the other half counter rotate (e.g., in the other direction); however, the rotors can be otherwise distributed between the two directions. At least one rotor per side (left/right) preferably rotates clockwise (and one rotor counterclockwise), at least one rotor above a lateral support member (e.g., in the forward configuration) preferably rotates clockwise (and one rotor counterclockwise), and/or at least one rotor below a lateral support member rotates clockwise (and one rotor counterclockwise); however the aircraft can include two, more than two, zero, or any suitable number of rotors in any of the aforementioned groups. The distribution of rotor rotation directions can be selected to enable continued flight operation and/or landing capability in the event of a failure of one or more propulsion assemblies. All rotors are preferably powered in all modes of flight and/or flight configurations (e.g., forward, transition, hover, etc.); however in variants a subset of rotors can be unpowered during one or more modes of flight (e.g., during forward flight, while changing heading, etc.)—which can conserve energy and/or improve heading control authority.

Example distributions of clockwise and counterclockwise rotors are shown in FIGS. 20A-D.

The support member of the aircraft 100, function to support the payload housing and transmit structural loads between the rotors. The set of support members (or a subset therein) can, in variants, function to generate lift in the forward configuration (e.g., during horizontal flight). In a first specific example, lateral support members generate less than a threshold proportion of aircraft lift in the forward configuration, such as less than: 100%, 95%, 90%, 75%, 50%, 40%, 30%, 20%, 10%, 5%, and/or any other proportion of aircraft (requisite) lift. In a second specific example, the lateral support members generate substantially no lift (e.g., less than 5%, less than 1%, etc.). In a third specific example, the lateral support members do not have an airfoil profile geometry over a portion or an entirety of the span. In a fourth specific example, one or more support members of the set creates drag or an aerodynamic force opposing lift or thrust.

The set of support members preferably includes multiple support members, but can additionally or alternatively include a single support member (e.g., a unitary piece). The set of support members can have any suitable arrangement. Support members can have endpoints at: rotor nacelles, tilt mechanisms, the payload housing exterior, other support members, and/or other components on the aircraft. The support members preferably connect endpoints rigidly (e.g., mechanically bonded, integrated, fastened, etc.), but alternately one or more endpoints can be rotatably connected (e.g., pivot relative to the tilt mechanism, pivot relative to the payload housing, pivot relative to a remainder of the airframe, etc.) and/or otherwise connected. Support members can connect any number of endpoint nodes on the aircraft (e.g., 2 endpoint nodes). In one example, the support member set preferably includes at least 2 anti-lateral support members and 1 lateral support member. However, the set of support members, can include any number support members in any suitable configuration.

In a first variant—the dual quadrilateral variant—the support members cooperatively form a closed quadrilateral geometry on each side of the aircraft (e.g., mirrored about the sagittal plane), with the three corner nodes of the quadrilateral lying at rotor nacelles and the fourth connecting them to the tilt mechanism or an extension off of the tilt mechanism (e.g., by an additional member). A specific example of the dual quadrilateral variant is shown in FIG. 4D. A second specific example of the dual quadrilateral variant is shown in FIG. 4H.

In a second variant—the bowtie variant—the support members form an outer polygon with corners at each of the rotor nacelles (examples of polygon geometries connecting different numbers of rotors shown in FIGS. 5A-5F), and a lateral support connects the distal (in the lateral direction) rotor nacelles to the tilt mechanism. In a first example, the lateral support span as a single continuous member. In a second example, the lateral support is divided across the payload housing and connected to the tilt mechanism at either side. The tie variant includes two opposing lateral support members on opposite sides of the payload housing which form the upper and lower members of the outer polygon in the forward configuration, and the forward and rearward members of the outer polygon in the hover configuration. The distance between the two opposing lateral support members can exceed (e.g., by a clearance distance such as 50 cm), both the length and height of the payload housing to avoid impacting the payload housing during the transition between forward and hover, but can be otherwise dimensioned. A specific example of the tie variant is shown in FIG. 4B.

In a third variant—the spaceframe variant—a different support member extends between each nacelle and the tilt mechanism (e.g., for N rotors, N support members connect the N rotors to the tilt mechanism). An additional lateral support connects the two uppermost (in the forward configuration) nacelles, and an additional set of support members forms a closed polygon with each of the rotor nacelles on the same side of the aircraft as endpoints (e.g., for six rotors: triangle on the left side and right side). A specific example of the spaceframe variant is shown in FIG. 4A.

In a fourth variant—the cross variant—the cross variant includes a set of lateral support members spanning between the left outermost and right outermost nacelles, and anti-lateral support members connecting a remainder of the rotors to the set of lateral support members. The set of lateral support members can be a single spanning lateral support member (an example is shown in FIG. 4E) or can include a left member and a right member connecting on either side of the tilt mechanism (an example is shown in FIG. 4G). Alternately, the endpoint on each side of the lateral support member can connect to another anti-lateral support member (e.g., for 8 rotor example shown in FIG. 5F).

In a fifth variant—the cross-beam variant—the nacelles are joined as in the cross variant, with the upper nacelles (in the forward configuration) connected by an additional support. This support can connect to the tilt mechanism, the set of lateral support members (from the cross variant), or to a beam extending from the tilt mechanism. An example of the cross-beam variant is shown in FIG. 4F.

In a sixth variant, the aircraft can include 2, 3, 4, 5, 6, 8, 10, 12, 14, and/or any other suitable number of rotors arranged as described in one of the aforementioned variants (e.g., with additional left/right, top/bottom, and/or front/back rotor pairs) and/or otherwise suitably arranged.

The set of support members can have any suitable angle(s) relative to the payload housing, tilt mechanism, other support members, and/or other reference point. The support members can extend perpendicular relative to the sagittal plane (straight out), or define an anhedral angle (an example is shown in FIG. 10B and FIG. 19A-F), dihedral angle (an example is shown in FIGS. 10A and 18A-F), forward sweep angle, rearward sweep angle. The angles can be: 0 deg, 5 deg, 10 deg, 15 deg, 20 deg, 30 deg, 45 deg, 60 deg, 70 deg, 75 deg, 80 deg, 85 deg, 90 deg, 0-15 deg, 15-30 deg, 30-60 deg, 60-75 deg, 75-90 deg, and/or any other suitable angle. The shape of the support members and/or airframe structure can be: an inverted gull shape, a gull shape, dihedral, anhedral, and/or any other suitable shape or geometry.

Figures 8A, 8B, 8C:
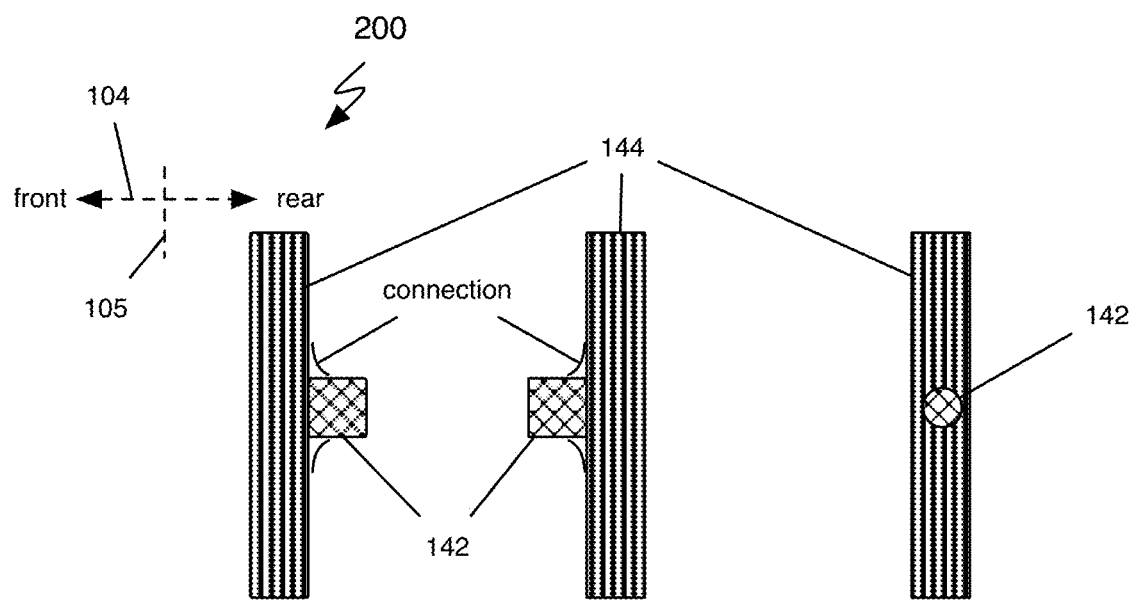
FIGS. 8A, 8B, and 8C are side view representations of a variant with an anti-lateral support member respectively forward, behind, and intersecting a lateral support member.

The set of support members can be assembled together in any suitable way to form the airframe (or a portion of the airframe, such as the support structure), and examples of this are shown in FIGS. 4A-4H. Preferably, the support members are arranged such that they have non-intersecting torsion boxes 148, such that the stiffness is not diminished by an irregularity in the internal structure/geometry, however the support members can alternately intersect (an example is shown in FIG. 8C), have nesting geometry exterior geometry, and/or be otherwise arranged. Preferably, anti-lateral support members are arranged forward of lateral support members (an example is shown in FIG. 8A), but can additionally or alternately be rearward of lateral support members (an example is shown in FIG. 8B). Connections between two support members can have any appropriate geometry, they can be: filleted, arcuate with constant radius, arcuate with variable radius, chamfered, aerodynamically optimized, and/or otherwise connected. The connection can be integrated with the support member (e.g., same component), a different component of the same material (e.g., composite), or different material (e.g., aluminum gusset fastened or bonded to the torsion boxes). In variants utilizing composite structures, the components can be manufactured in the same composite layup, manufacturing can include different composite layups for external support structures, or the components can be otherwise manufactured/bonded. In variants, more than two support members can connect and/or intersect at a single endpoint, node, or connection.

Figure 22A:
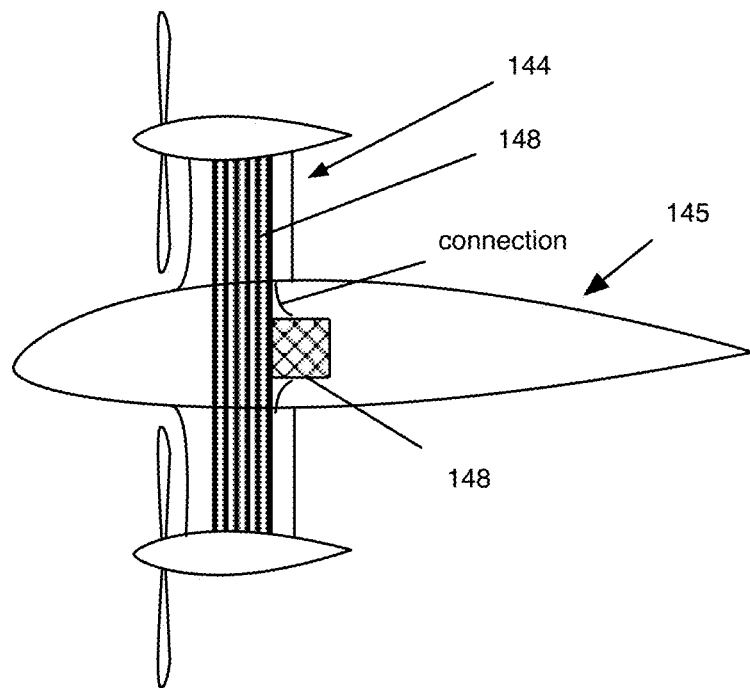
FIG. 22A is a side view cross sectional representation of a variant of the airframe, illustrating a connection between lateral and anti-lateral support members.

In a first variant, torsion boxes 148 can occupy a portion of the cross section of the support member cross-sectional profile, such that intersecting support members can have non-intersecting torsion boxes. An example is illustrated in FIG. 22A.

The support members can have any exterior geometry. Support members preferably have a symmetric airfoil cross section, but can alternately have an asymmetric airfoil cross section; an aerodynamically efficient shape, such as a rounded/arcuate leading edge and a tapering thickness towards a trailing edge (e.g., pointed, flat, etc.); a stiffness-driven geometry (e.g., circular cross section, hexagonal cross section, etc.); a non-aerodynamic geometry; rectangular, ovoid, circular, triangular, and/or any other suitable cross section geometry. Support members can be: straight, constant cross section, arcuate (e.g., curved, bowed), tapered (e.g., reduction in cross sectional area along the span in a direction of the taper), un-tapered (e.g., constant cross sectional profile), gull-wing (or inverted gull wing) shaped, angled, and/or have any other suitable spanwise shape. Lateral support members can be straight, bent, and/or curved along a longitudinal axis, and/or define any other suitable geometry.

In a specific variant, support members can be wings 145, and can include: a left wing, a right wing, a top wing, front wing, rear wing, a bottom wing, a wing spanning a full width of the airframe.

The set of support members can have any suitable internal construction. Preferably, support members include a torsion box which is integrated or connected internally inside of the support member to provide torsional stiffness/rigidity. The torsion box has a tubular structure can have the same cross-sectional profile as the support member (e.g., ribs and spars supporting the exterior), or have a different cross-sectional profile such as: round, square, hexagonal, rectangular, and/or any other suitable geometry. Preferably, the torsion box has an internal grid of beams/supports extending in a radial, lateral, longitudinal, vertical, skew, or other orientation, but can also have a honeycomb, 3D honeycomb, prismatic, wave pattern, rib/spar, and/or other internal structure. However, a support member can be: solid (e.g., solid beams), hollow shells, include internal trusses, or otherwise constructed. The support members (and internal structures) are preferably made of a composite material (e.g., carbon fiber, fiberglass, etc.), but can additionally or alternately include metal or metal alloys (e.g., steel or aluminum), plastic, any combination thereof, and/or any other suitable material.

Figure 24A:
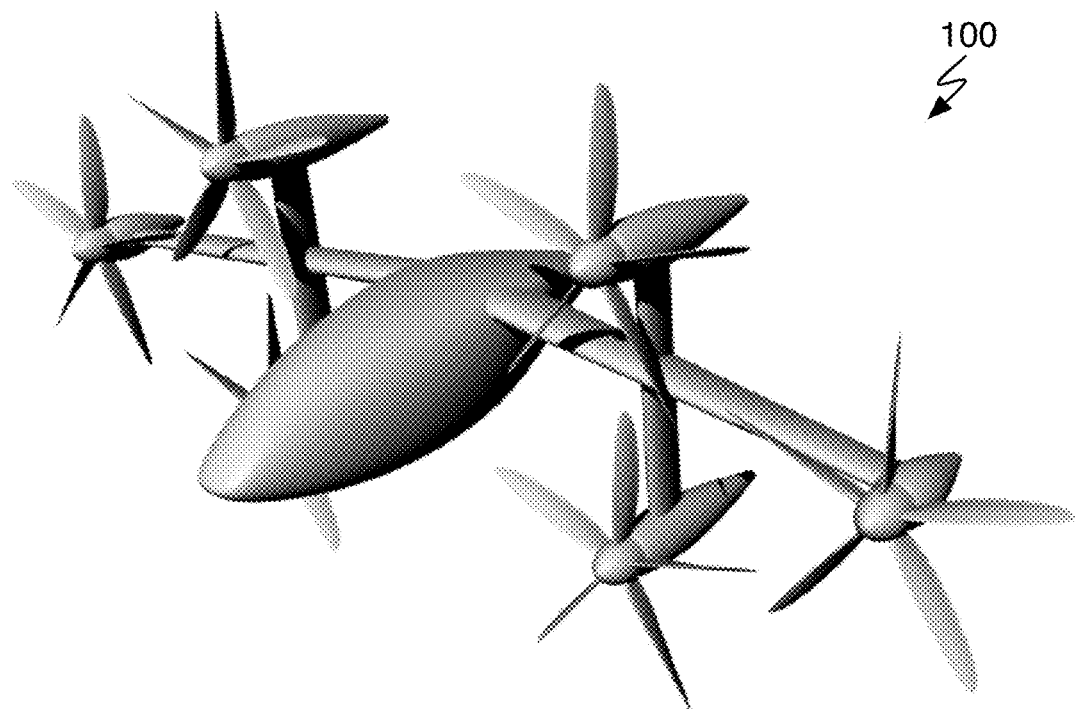
FIG. 24A-B are isometric views of a variant of the aircraft in the forward and hover configurations, respectively.
Figure 24B:
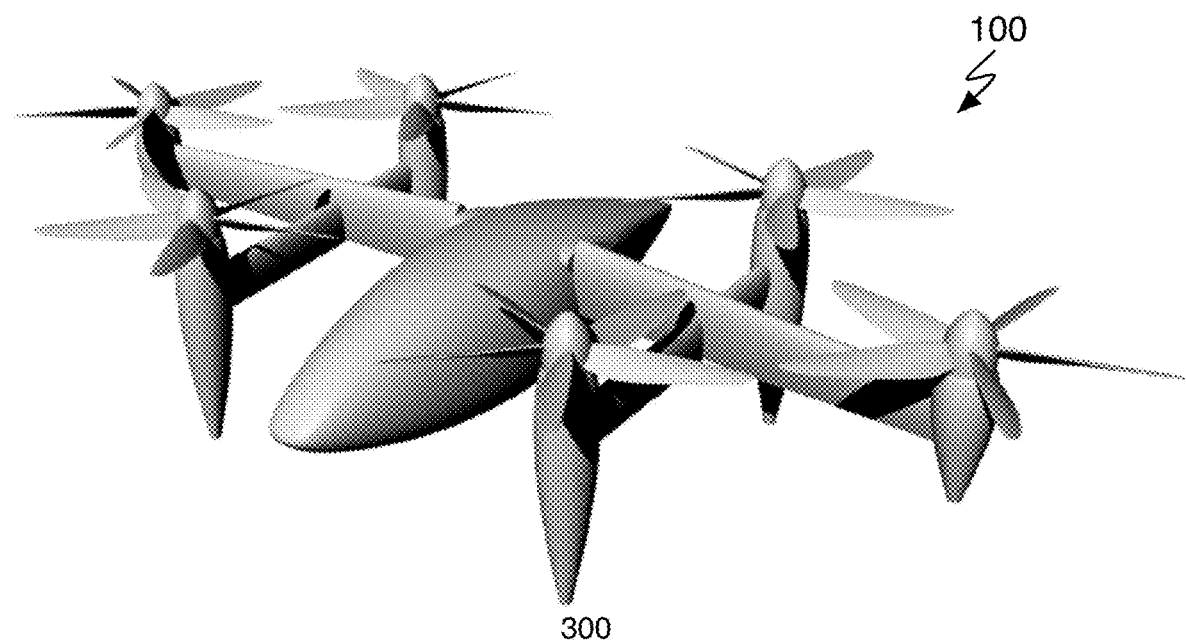
Figure 25A:
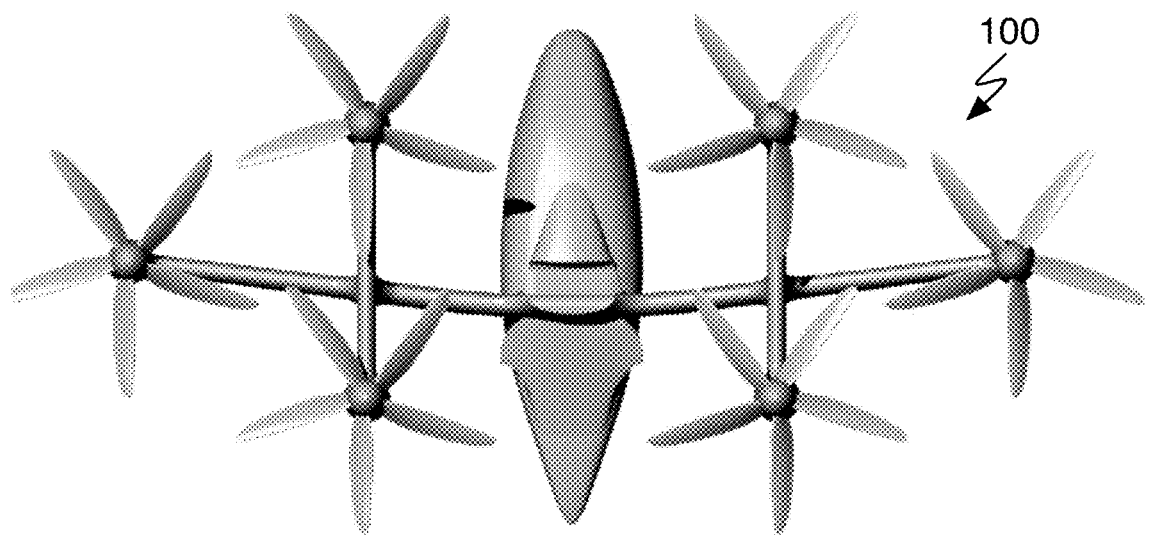
FIG. 25A-B are top views of a variant of the aircraft in the hover and forward configurations, respectively.
Figure 25B:
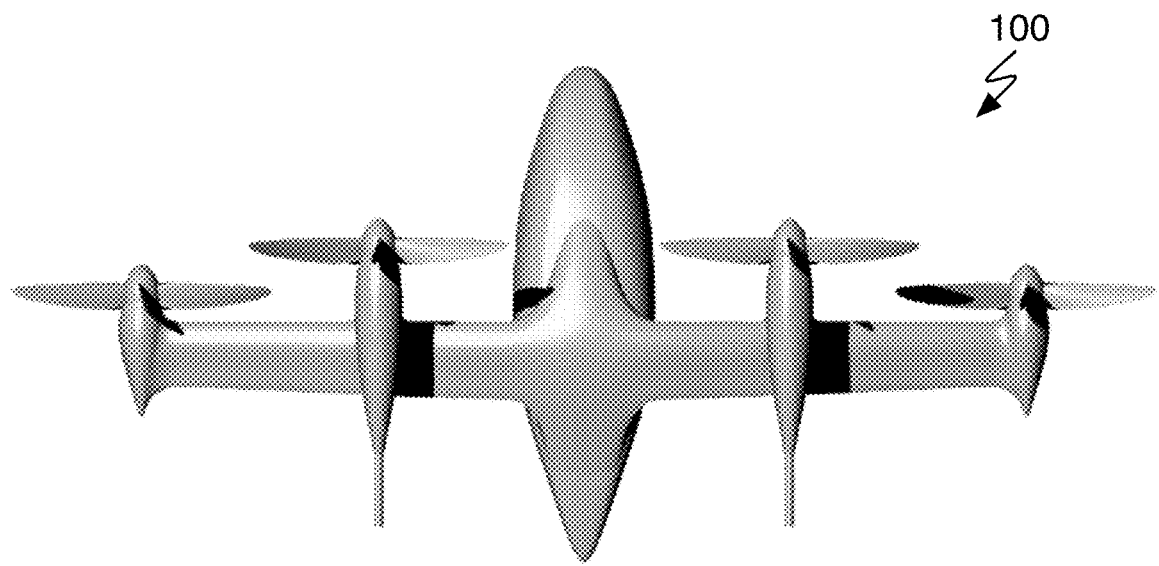
Figure 25C:
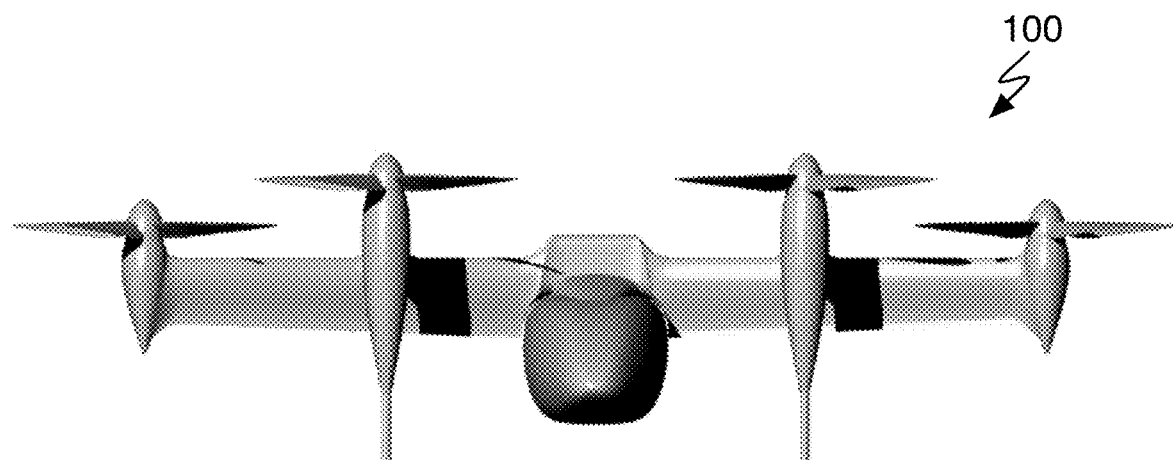
FIG. 25C-D are front views of a variant of the aircraft in the hover and forward configurations, respectively.
Figure 25D:
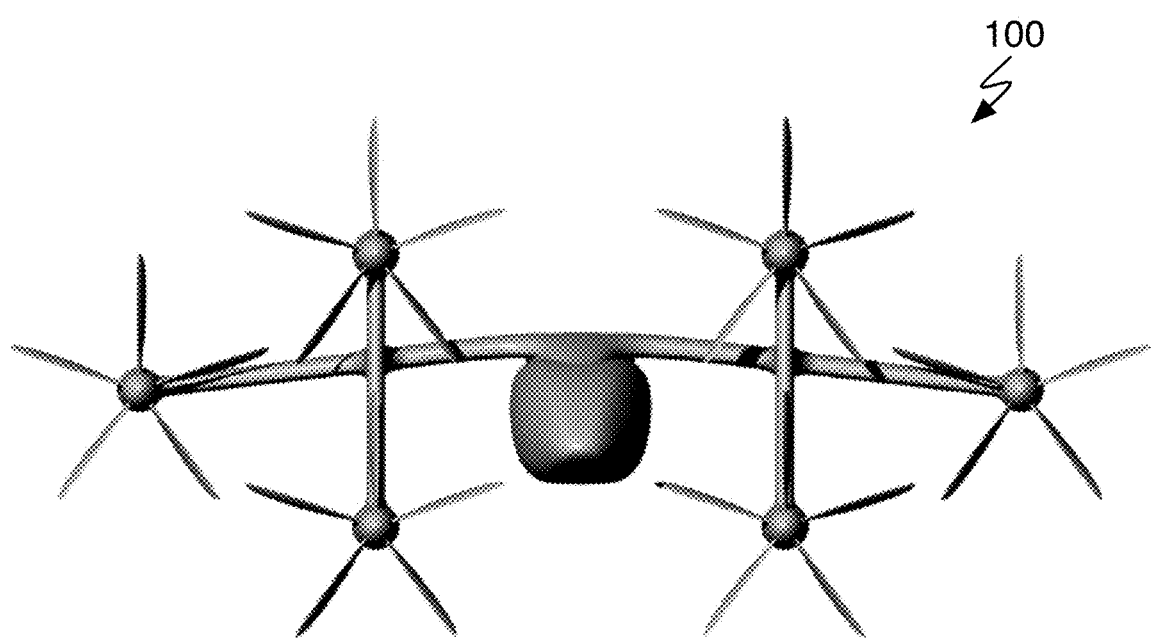
Figure 25E:
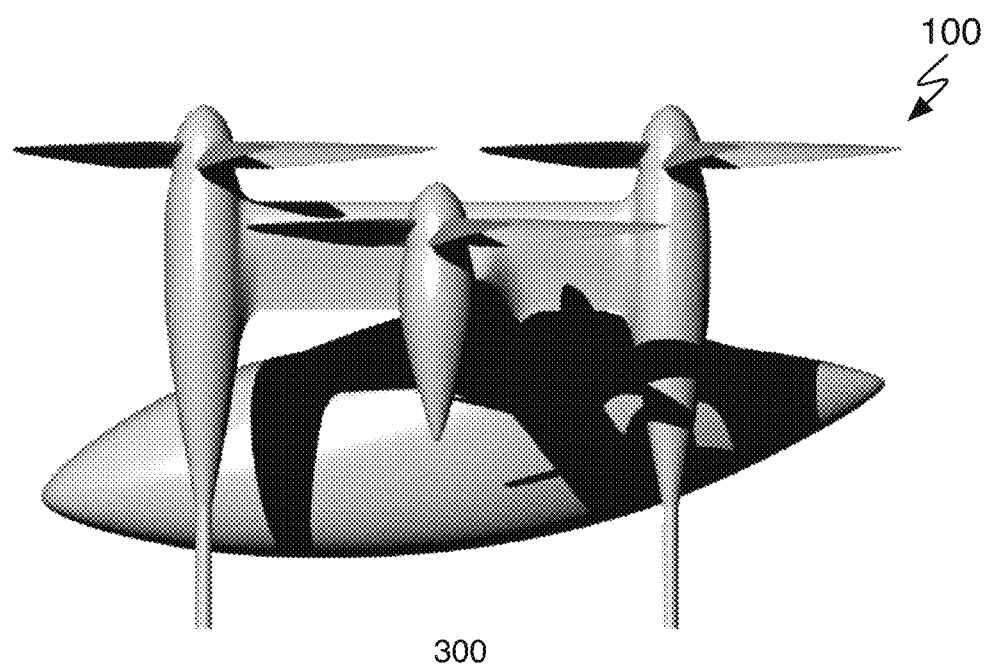
FIG. 25E-F are side views of a variant of the aircraft in the hover and forward configurations, respectively.
Figure 25F:
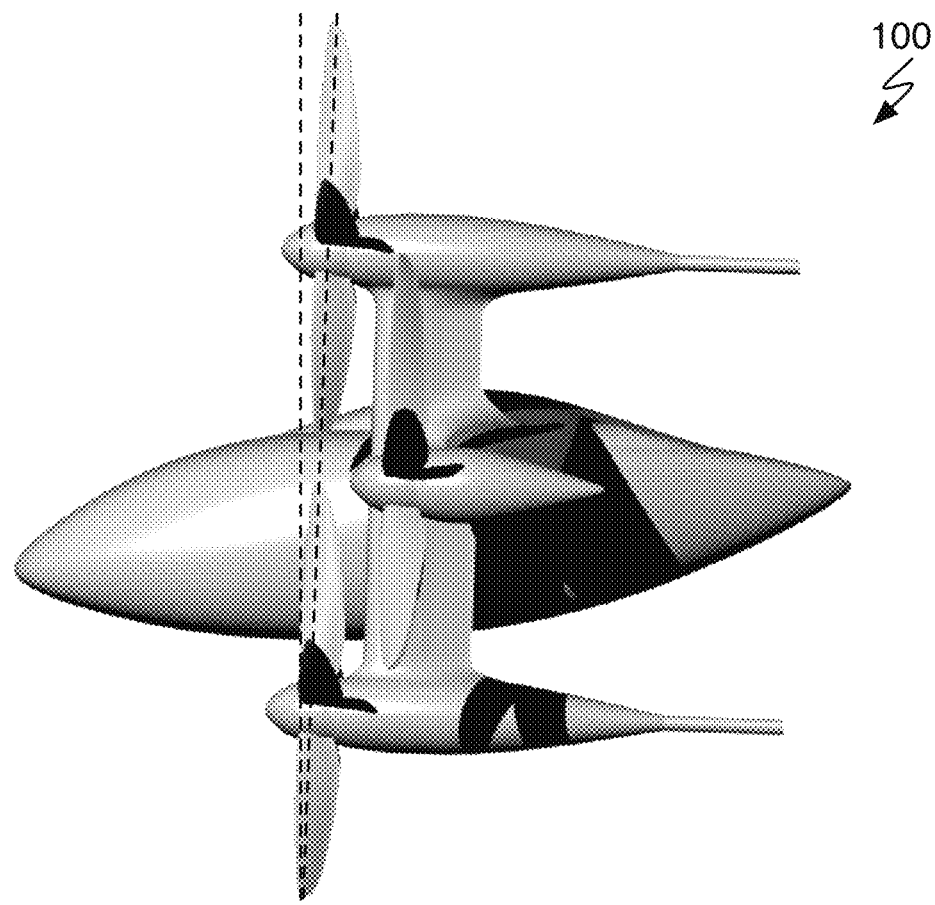
Figure 25G:
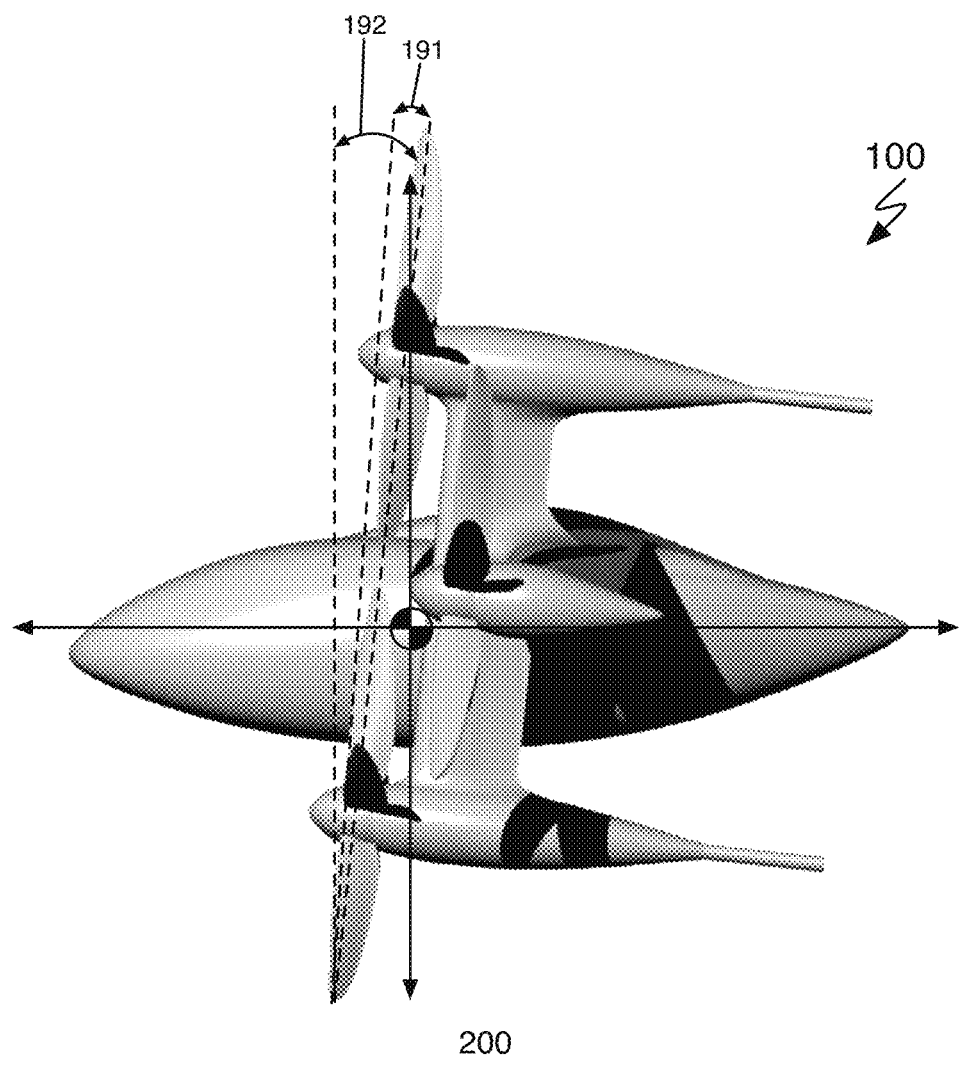
FIG. 25G is a side view of a variant of the aircraft in the forward configuration.

The set of support members can include any suitable number of lateral support members 142. The set of support members can include: 1, 2, 3, 4, 5, 6, or more than 6 lateral support members. Preferably, "lateral" support members as referenced herein refer to support members which define an angle greater than 45 degrees with respect to the sagittal plane of the aircraft or airframe (i.e. perpendicular to the sagittal plane or closer to perpendicular than parallel). However, a lateral member can additionally or alternately be: support members that define an angle with the sagittal plane which is greater than: 45 deg, 50 deg, 60 deg, 75 deg, 80 deg, 85 deg, support members exactly perpendicular to the sagittal plane, support member exactly parallel to the frontal plane, support members, and/or otherwise suitably defined. The set of support members can include any suitable number of lateral support members per side, such as one per side, two per side, three per side, and/or any other suitable number. The set of support members can include a rigid connection between the wings on opposing sides of the aircraft, or the left and right sides can be split (for example, the left and right wings can be independently actuated by the tilt mechanism; an example is shown in FIGS. 24A-B).

The lateral support members can individually or collectively define any suitable wing area for the aircraft. The wing area can refer to: the vertical projection of the wing, the chord length integrated in the spanwise direction, the area of the upper surface of the wing, and/or otherwise suitably defined. However, the wing area can otherwise be suitably defined.

The set of support members can include any suitable number of anti-lateral support members 144 (e.g., vertical support members). The set of support members can include: 1, 2, 3, 4, 5, 6, or more than 6 anti-lateral support members. Preferably, anti-lateral support members as referenced herein refer to support members which define, in the forward configuration, an angle less than 45 degrees with respect to the sagittal plane (i.e. parallel to the sagittal plane or closer to parallel than perpendicular); however the threshold to define an anti-lateral support member can additionally or alternatively be support members which define an angle with the sagittal plane which is less than: 5 deg, 10 deg, 15 deg, 20 deg, 30 deg, 40 deg, support members exactly parallel to the sagittal plane, support members perpendicular to a lateral support member, any support member which is not a lateral support member, and/or otherwise suitably defined. The sagittal plane (e.g., longitudinal plane) can extend along: the payload housing's longitudinal and vertical axis, the wing or lateral support member's span and chord, or be otherwise defined. An anti-lateral support member 144 is preferably mounted to a lateral support member, but can be otherwise mounted. Each anti-lateral support member preferably extends beyond a first and second side (e.g., broad face, broad surface) of the respective mounting component (e.g., above and below the lateral support member in the forward configuration), but can additionally or alternatively: extend beyond a single side of the mounting component, include a first and second end arranged on opposite sides of the mounting component's broad surface or transverse plane (e.g., encompassing a span and chord of the lateral support member), or be otherwise arranged.

In a specific variant, the aircraft includes a lateral support member (e.g., wing) and an anti-lateral support member mounted to and fully supported by the lateral support member. In the specific variant, one or more rotors can be mounted to the lateral support member outboard of the lateral support member, mounted to the lateral support member inboard of the anti-lateral support member, mounted to the anti-lateral support member (above and/or below the connection between the anti-lateral support member and the lateral support member), mounted to the end of the anti-lateral support member, mounted to the end of the lateral support member, and/or otherwise arranged.

Figure 22B:
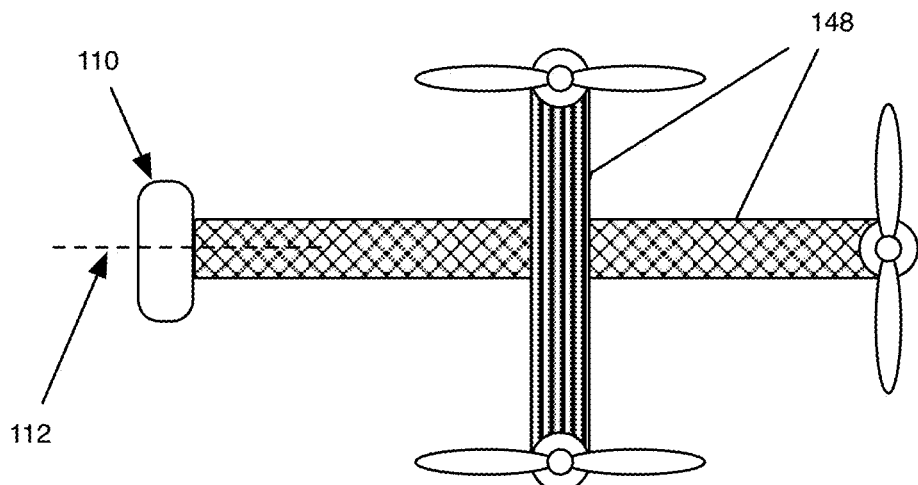
FIG. 22B is a partial schematic representation of a variant of the airframe.
Figure 22C:
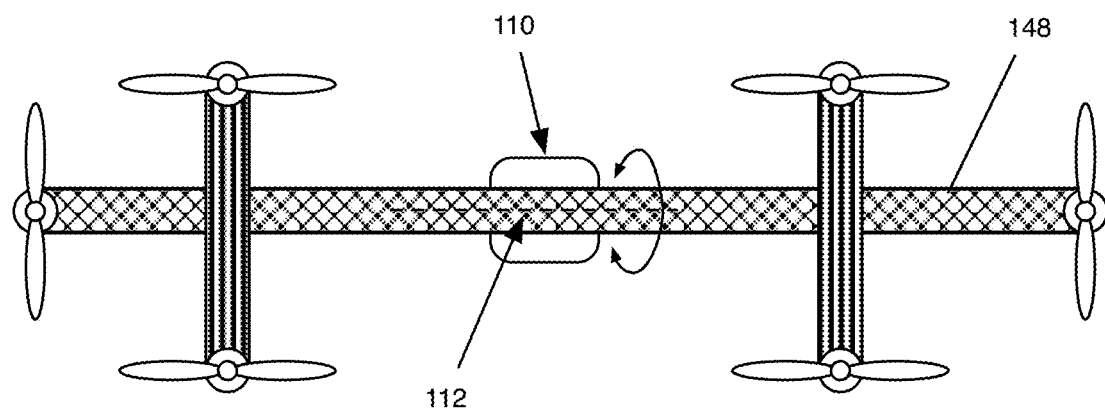
FIG. 22C is a schematic representation of a variant of the airframe.

In a first example of the specific variant, the airframe includes: a left wing; a right wing; a left anti-lateral support member coupled to the left wing; and a right anti-lateral support member coupled to the right wing. A first end of the left anti-lateral support member is arranged above the left wing and a second end of the left anti-lateral support member is arranged below the left wing. A first end of the right anti-lateral support member is arranged above the right wing and a second end of the right anti-lateral support member below the right wing. In the first example of the specific variant, the airframe further includes: a left outboard propulsion assembly mounted to the left wing outboard of the left anti-lateral support member; a right outboard propulsion assembly mounted to the right wing outboard of the right anti-lateral support member; a first and second inboard propulsion assembly mounted to the first and second ends of the left anti-lateral support member, respectively; and a third and fourth inboard propulsion assembly mounted to the first and second ends of the right anti-lateral support member, respectively; wherein each of the plurality of propulsion assemblies comprises: an electric motor; and a propeller rotatably coupled to the electric motor about an axis of rotation. The left wing can include a torsion box extending from the tilt mechanism to the left outboard propulsion assembly, and the left anti-lateral support member can include an anti-lateral torsion box extending from the first propulsion assembly to the second propulsion assembly. Preferably, the anti-lateral torsion box does not intersect the torsion box in the wing; however the anti-lateral torsion box can alternately intersect the wing's torsion box, be formed as a single component, and/or be otherwise implemented. The torsion box in the left wing can terminate at the tilt mechanism (an example is illustrated in FIG. 22B), terminate at a nacelle node of a propulsion assembly, extend from the left outboard propulsion assembly to the right outboard propulsion assembly (an example is shown in FIG. 22C), or be otherwise configured.

The set of support members can optionally include any suitable number of ground support members. Ground support members function to support the aircraft on the ground (and/or in a taxi configuration). Ground support members can be integrated into the airframe, connected to the tilting mechanism, connected and/or integrated into the rotor nacelles, and/or otherwise implemented. Preferably, ground support members extend to the ground (e.g., below the payload housing) in the hover configuration of the tilt mechanism, but can alternately always extend below the payload housing (e.g., connected to the same part of the tilting mechanism as the payload housing), and/or otherwise support the aircraft on the ground. Ground support members can optionally be dampened (e.g., with rubber, compressible springs, etc.) and/or include rollers (e.g., for ground taxiing), but can alternately include skids (e.g., for water landings) and/or be otherwise implemented. Preferably, ground support members contact the ground at three or more points (e.g., 4 points, 6 points, for N number of rotor nacelles contact at N points, etc.), but can be otherwise configured.

The aircraft 100 can include a tilt mechanism which functions to transform the rotors between the forward configuration and the hover configuration. The tilt mechanism can optionally adjust the angle of attack, change the dihedral angle, or otherwise actuate the support member and/or rotor position. The tilt mechanism is preferably electromechanical, but can alternately operate by pneumatic, hydraulic, and/or other actuation. The tilt mechanism actuation can be achieved by a rotation, linear actuation, combination of rotary and linear actuation, or otherwise actuated. The tilt mechanism is preferably integrated into a support member (e.g., middle section of a lateral support member), but can alternately mount to a support member, mount to multiple support members, mount to the airframe, mount to the payload housing, be integrated with the payload housing, and/or be otherwise implemented. When the tilt mechanism mounts multiple support members, the tilt mechanism can actuate the multiple support members: independently, together, and/or with any other suitable relationship. Support members connected to the tilt mechanism can be: cantilevered, over-hanging, double over-hanging, trussed (by additional support members/connections), and/or otherwise connected. The payload housing (and/or cargo pod) is preferably suspended from the tilt mechanism, but can additionally or alternately be integrated into, bonded, fastened, and/or otherwise connected to the tilt mechanism. The tilt mechanism can be incorporated into the airframe, with the pod attaching to a residual part of the airframe which separate from the wing, wherein the tilt mechanism actuation is fully contained within the airframe. Alternatively, the tilt mechanism can be separate from the airframe. In a first variant, the tilt mechanism is connected to the payload housing and a middle section of a lateral support member. In a second variant, a left side of the tilt mechanism connects to the end of a left lateral support member, and a right side of the tilt mechanism connect to the end of a right lateral support member. In a first example of the second variant, the tilt mechanism connects to the top of the payload housing. In a second example of the second variant, the tilt mechanism is integrated into the exterior of the payload housing (and/or fuselage).

In variants, the tilt mechanism can transform the wing (or lateral support members) by a transformation angle 194, which can be >95 deg, 95 deg, 92 deg, 90 deg, 89 deg, 87 deg, 85 deg, 80 deg, 75 deg, <75 deg, any range bounded by the aforementioned angles, and/or any other suitable angle.

Figure 11A:
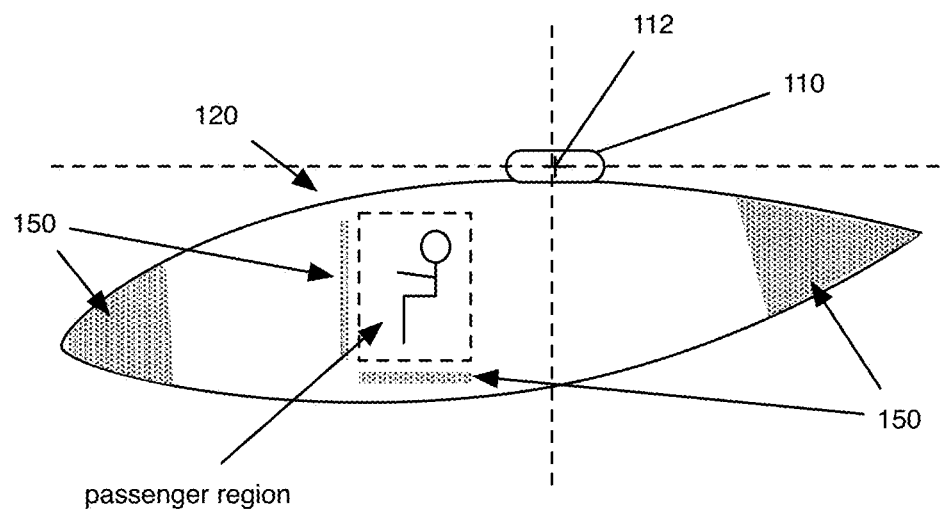
FIG. 11A is a side view schematic representation of a variant of a payload housing including a passenger region.
Figure 11B:
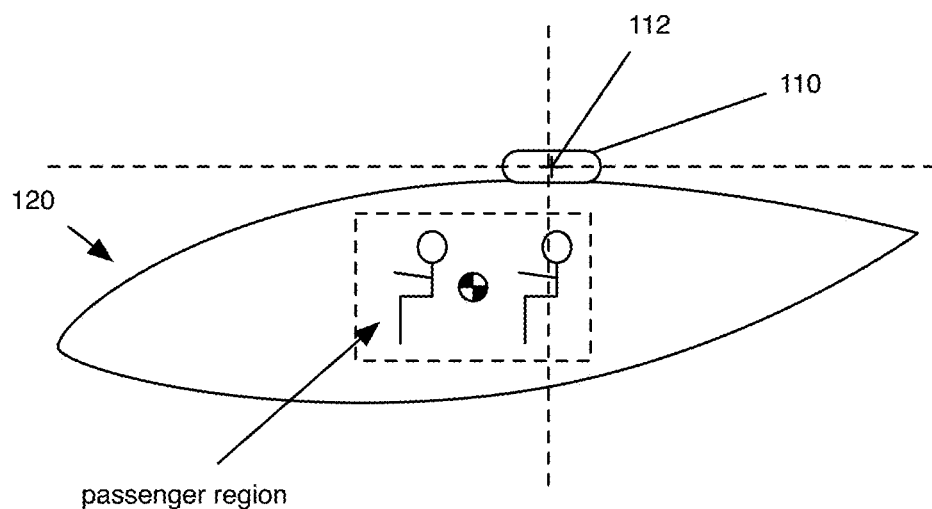
FIG. 11B is a side view schematic representation of a variant of a payload housing including a passenger region.
Figure 12A:
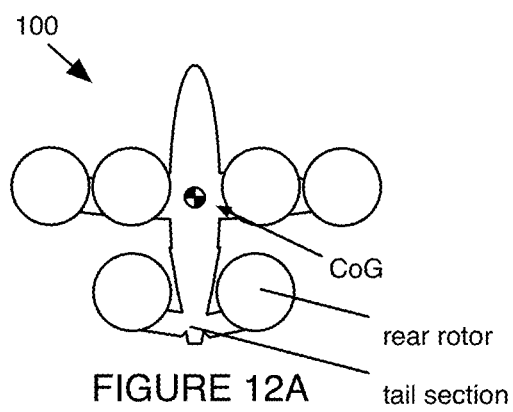
FIG. 12A is a top view schematic representation of a variant of the aircraft including a rear rotor in the hover configuration.
Figure 12B:
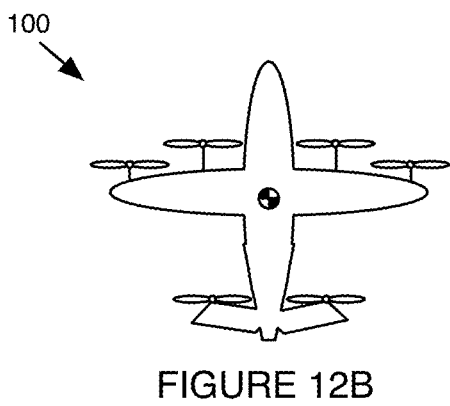
FIG. 12B is a top view schematic representation of a variant of the aircraft including a rear rotor in the forward configuration.
Figure 12C:
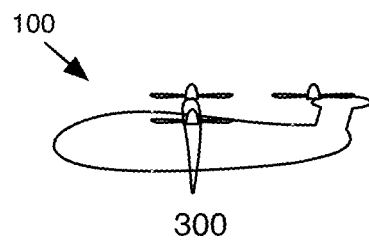
FIG. 12C is a side view schematic representation of a variant of the aircraft including a rear rotor in the hover configuration.
Figure 12D:
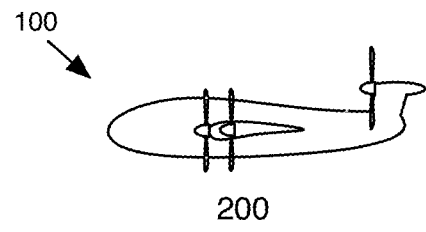
FIG. 12D is a side view schematic representation of a variant of the aircraft including a rear rotor in the forward configuration.
Figure 23A:
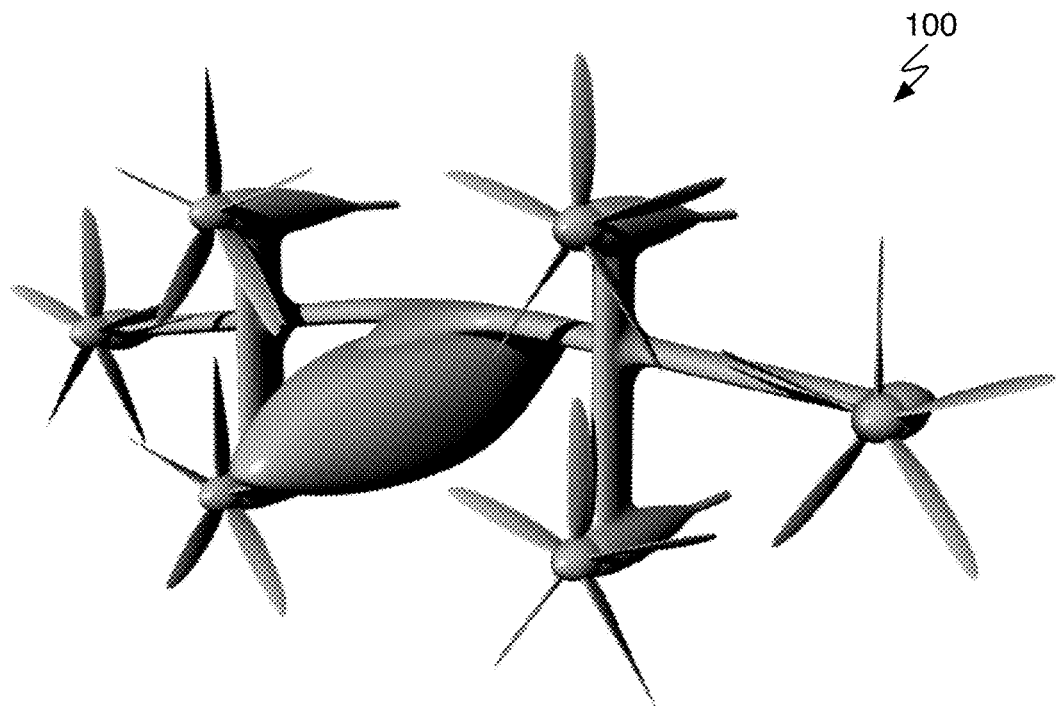
FIG. 23A-B are isometric views of a variant of the aircraft in the forward and hover configurations, respectively.
Figure 23B:
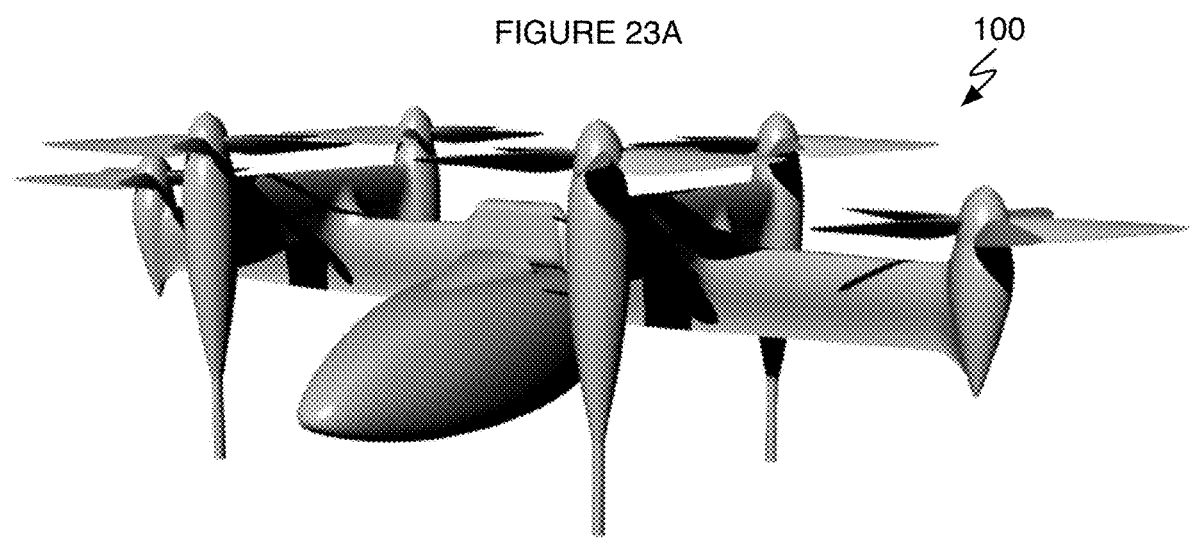

The tilt mechanism can have any suitable arrangement on the aircraft relative to the CoG, principal axes (e.g., lateral, longitudinal, vertical), and/or any other suitable reference. The tilt mechanism is preferably centered along the lateral axis of the aircraft, symmetric about the sagittal plane of the aircraft, and/or otherwise located laterally on the aircraft. The tilt mechanism preferably defines a tilt axis about which the tilt mechanism pivots/rotates. The tilt axis is preferably above and/or behind the: aircraft CoG (an example is shown in FIG. 23A-B), CoG of the payload, passenger region (an example is shown in FIGS. 11A-B), payload housing, and/or other reference on the aircraft. Additionally or alternatively, the tilt axis can be centered about, forward of, and/or below the lateral (pitch) axis and/or the CoG, or otherwise suitably located. In a first variant, the tilt axis is located on an upper portion of the payload housing, above the payload housing, and/or otherwise does not infringe on the payload housing space. In a second variant, the tilt axis extends through the thickness of the payload housing wall, but does not extend into a portion of the payload housing where passengers and/or cargo reside. In a third variant, the tilt axis lies above the payload housing.

Figure 10A:
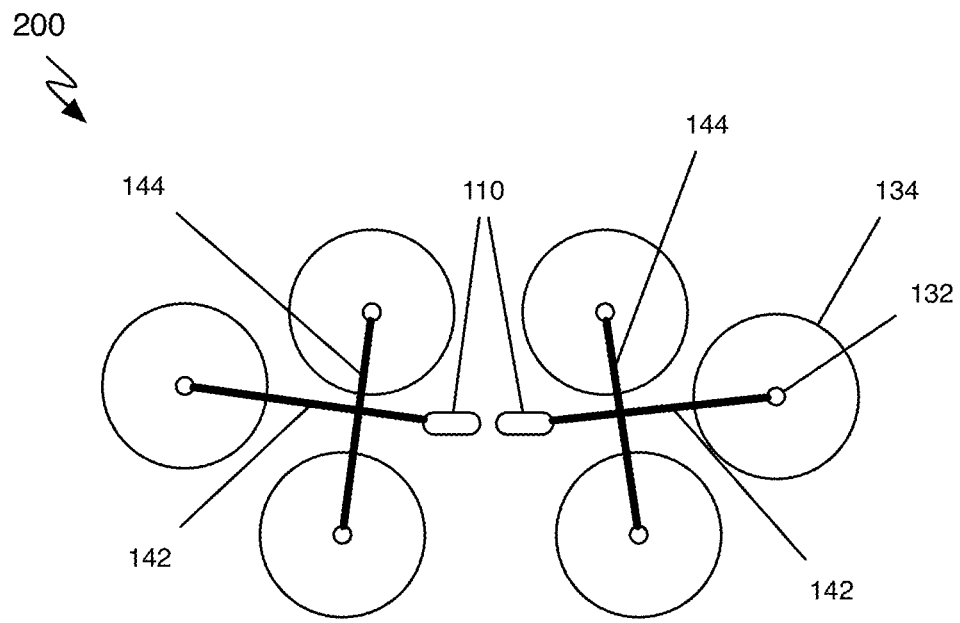
FIGS. 10A and 10B are a front view schematic representations of a first and second variant of the system in the forward arrangement, respectively.
Figure 10B:
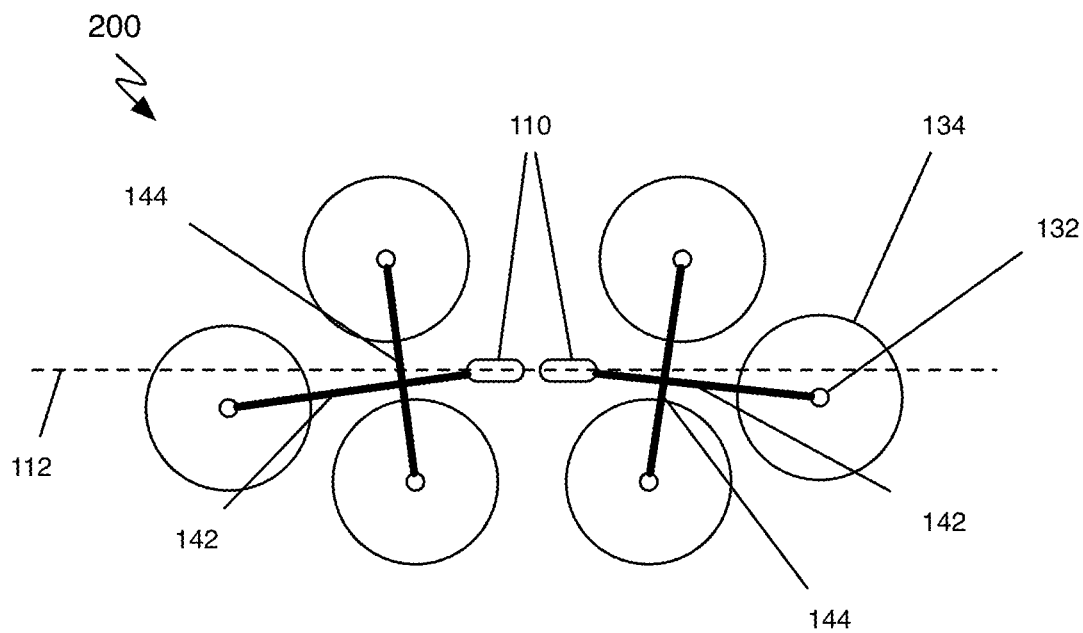

In a first specific example, a left component of the tilt mechanism and a right component of the tilt mechanism pivot a left set of the support members and a right set of the support members relative to the payload housing about the tilt axis (an example is shown in FIG. 10B), respectively.

In a second specific example, a left component of the tilt mechanism and a right component of the tilt mechanism pivot a left set of the support members about a first tilt axis and a right set of the support members about a second tilt axis, respectively, wherein the first tilt axis and the second tilt axis lie in the same plane.

The tilt mechanism can optionally operate in conjunction with a locking mechanism which functions to prevent the payload housing, airframe, support members, rotors, and/or other components from rotating in an uncontrolled or unintended manner if the tilt mechanism fails. Preferably, the locking mechanism defaults to a locked position (e.g., in power failure scenario) which does not require continuous power to retain the angular position of the tilt mechanism. The locking mechanism can include: a non-backdrivable mechanism (e.g., ratcheting, worm-ger, etc.), hydraulic locking, pneumatic locking, an external braking mechanism (e.g., such as a disk brake), and/or other locking mechanism. The locking mechanism can engage: in a power failure scenario, if the relative angular position of the left side and the right side of the airframe about the tilt axis exceeds a predetermined threshold (e.g., 1 deg, 3 deg, 5 degrees, etc.), in response to a user input, and/or on any other event driven basis.

The tilt mechanism can additionally function to transform the lateral support members (e.g., left wing, right wing, wings, etc.) about the pitch axis (e.g., lateral axis). The tilt mechanism can rotate the lateral support members by >95 deg, 95 deg, 92 deg, 90 deg, 89 deg, 87 deg, 85 deg, 80 deg, 75 deg, <75 deg, any range bounded by the aforementioned angles, and/or any other suitable angle.

The tilt mechanism can additionally or alternately operate in conjunction with one or more rotor tilt mechanisms, which can pivot a set of rear rotors, outboard rotors, and/or other rotors independently of the remainder of the airframe (e.g., about an axis different from the tilt axis). In a specific example, the rotor tilt mechanism is the mechanism described in U.S. application Ser. No. 16/409,653, filed 10 May 2019, which is incorporated in its entirety by this reference. However, any other suitable tilt mechanism can be used.

In a first variant, the left and right wings are fixed relative to each other. In a first example, a torsion box extends through the tilt mechanism and couples the left wing to the right wing. In a second example, each wing includes a torsion box rigidly connected at the tilt mechanism. In a third example, the tilt mechanism can include a left actuator connected to the left wing, a right actuator connected to the right wing, and an interlock preventing relative motion of the left and right actuators (e.g., beyond a threshold, etc.). The interlock can be default locked or default unlocked, can be passive or active, can be mechanical or electromechanical, or can be any other suitable type of interlock.

In a second variant, the left and right wings can be independently transformed relative to the pitch axis, which can enable additional roll control authority (e.g., no bank turns, tighter turn radius, etc.). This can present an additional failure mode—loss of tilt control function of one or both wings—which can be mitigated by additional redundancies in the system, such as for aircrafts with human passengers or triply redundant aircrafts. In less safety critical aircrafts (e.g., unmanned aircraft, autonomous aircraft, delivery aircraft, etc.), loss of tilt control can be mitigated by control augmentation, emergency landing, and/or otherwise mitigated or unmitigated.

In a third specific variant, the tilt mechanism of the aircraft can change the aerodynamic force generated by the wing(s) and the net thrust (and/or lift) from the rotors by independently tilting the left and/or right wings of the aircraft (and all of the propulsion assemblies mounted thereto). Independent actuation of the left and right wings can create a net yaw moment while balancing roll moments, thereby enabling heading changes without banking the aircraft.

The aircraft can include a payload housing coupling mechanism, which functions to connect the payload housing to the tilt mechanism. The payload housing coupling can include mechanical which connect the payload housing to the tilt mechanism, support member structure, and/or other aircraft structural elements. The payload housing coupling can include electrical connections which connect: sensors, pilot controls, HVAC, lighting, and/or other equipment requiring electrical connections in the payload housing. The electrical connections can include wire management (e.g., slip ring connector or similar) to avoid stressing, fatiguing, and/or damaging wires during the transition between forward and hover. In variants including a modular payload housing pod, the payload housing coupling mechanism can selectively connect and disconnect the payload housing from the airframe, a remainder of the aircraft structure, and/or various electrical endpoints (e.g., batteries, motors, etc.).

The aircraft 100 can include a payload housing which functions to protect and carry the aircraft payload. The payload can include: 1 or more human passengers (e.g., 2) and/or articles of luggage, packages, cargo, food deliveries, and/or other equipment related to aircraft operation. Preferably, the payload include 3 or more human passengers (e.g., 3, 4, 5, 6, more than 6), and can optionally include a pilot (along with pilot input control mechanisms). Additionally or alternately, the aircraft can be remotely piloted and/or operate autonomously.

In a first variant, the aircraft is a delivery drone, and the payload housing carries packages such as food or user goods directly to a user or intermediary (e.g., service location, vehicle, distribution center, delivery person, etc.).

In a second variant, the aircraft is a camera drone. The payload housing carries a camera used for scanning a region and/or performing imaging services. The aircraft can optionally be equipped with onboard memory for storing the images and/or can be equipped to stream imaging data to a user or remote system.

Figure 21:
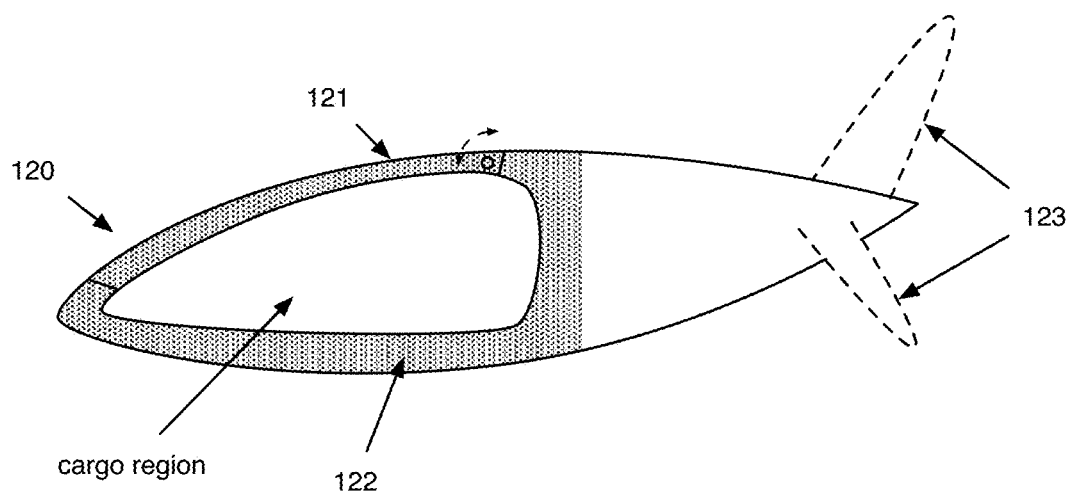
FIG. 21 is a side view schematic representation of an example payload housing including an insulated cargo region.

In a third variant, the aircraft is employed for aerial dispersion. The payload housing can be equipped to carry a chemical agent (e.g., pesticide), animals (e.g., living fish), organic particulates (e.g., seeds, soil), water, and/or other payloads. The payload housing can optionally include a dispersion system for ejecting the payload via a pressurized or aerosol spray, release hatch, or other means of dispersal. The cabin, cargo hold, and/or payload housing can: include insulation 122 (such as in the example in FIG. 21) or be uninsulated, include temperature conditioning (e.g., via heating and/or cooling systems) or be unconditioned (e.g., no onboard heating and/or cooling systems), be air-tight or not air-tight, include windows or not include windows (e.g., or otherwise not optically connected to the aircraft exterior), include an inceptor (or other pilot input mechanism) or not include an inceptor (or other pilot input mechanism), include cargo bays, include tiedowns, house a battery pack or other power source, and/or include any other suitable characteristics/features. The payload housing can optionally include a cover 121 which can function to selectively allow access to the interior, such as during payload loading and/or unloading. The cover can be a clamshell, gull-wing, side-open (e.g., like a car door), sliding, snap in, hinged, bottom panel, and/or other suitable cover. The cover can additionally or alternately function to form a portion or entirety of the external profile of the payload housing, and to enclose and/or protect the payload (e.g., passengers, delivery goods, etc.).

Figure 9:
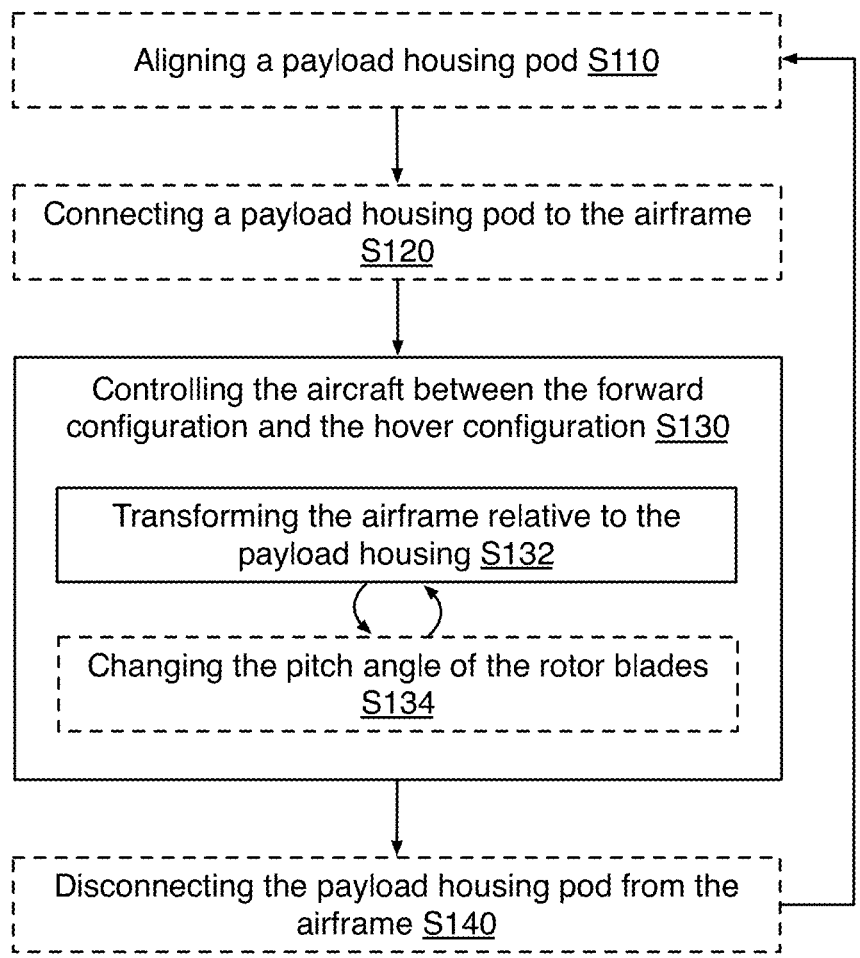
FIG. 9 is a flow chart diagram of a variant of the method.

In a specific variant, the payload housing includes a modular pod which functions to detach from the remainder of the aircraft to allow modularity and reconfigurability. The pod can connect and/or disconnect: automatically, partially automatically (e.g., pilot initiated sequence), manually, and/or in any other suitable manner. In a specific example, the pod is connected with the assistance of an alignment mechanism (an example method is shown in FIG. 9), which can operate based on: computer vision; physical alignment features such as tapering grooves/channels, a reference frame or key, and/or other self-locating geometry; variance-tolerant connections (e.g., can tolerate: <1 mm deviation, <5 mm deviation, <1 cm deviation, <3 cm deviations, <5 cm deviations, etc.); and/or any other suitable mechanisms. The payload housing coupling mechanism which operates in conjunction with a modular pod can utilize any suitable mechanical fasteners and/or mechanical coupling technique (e.g., to achieve clamping, retaining, latching, etc.) such as: magnetic fasteners, hydraulic actuators, pneumatic actuators, electromechanical actuators, spring assisted actuators, and/or otherwise fastening or securing the modular pod.

The aircraft 100 can optionally include an impact attenuator which functions to mitigate effects of an impact on the aircraft and/or payload. The impact attenuator can be located at the rear of the pod (an example is shown in FIG. 11A), below the passenger region, in front of the passenger region, at the front of the payload housing, at the bottom of the payload housing, side of the payload housing, and/or in any other appropriate location. The impact attenuator can be mounted internally, externally, integrated into the construction of the airframe or payload housing, and/or otherwise mounted. In a first variant, the impact attenuator is passive: one or more portions of the payload housing are crushable, collapsible, and/or deformable to mitigate the forces/accelerations experienced by the payload (e.g., passengers) in an impact scenario. The crushable portions of the aircraft can be the same or different material from a remainder of the payload housing. They can be constructed of: foam, aluminum (e.g., in a honeycomb structure), spring steel, and/or other material. In a second variant, the impact attenuator can include a self-inflating gas cushion (e.g., airbag) or other active safety system which deploys on impact.

The aircraft 100 can optionally include a set of power sources which function to supply power to the set of rotors. Preferably, the power source includes one or more batteries (e.g., arranged into battery packs), but can additionally or alternately include fuel cells, liquid fuel (e.g., gasoline, diesel, jet fuel, etc.), and/or any other suitable power sources. The power sources can be housed: inside nacelles, in the airframe, outside of the payload housing, inside of the payload housing, in an empennage, inside of support members, mounted to support members, in a dedicated enclosure mounted to the airframe, and/or in any other appropriate location.

In variants, the power source can be hot swappable, removable, replaceable, and/or interchangeable. In a specific example—where the power source includes one or more battery packs—battery packs can be configured to be charged onboard the aircraft, configured to be charged offboard the aircraft (e.g., removed for charging), configured to be replaced with a fully charged battery pack, and/or otherwise configured. Such variants can increase aircraft uptime, reduce charging time, reduce required part count on the aircraft, and/or otherwise improve operational efficiency.

The airframe preferably includes the nacelles, support members (and the connections between the support members), and/or any other structural components. In a first specific example, the airframe can include a structural payload housing with the tilt mechanism integrated into the payload housing. In a second specific example, the airframe includes an empennage (e.g., with a set of control surfaces, with a set of rear rotors, etc.). An example of an aircraft including an empennage is shown in FIGS. 12A-D.

The aircraft 100 can include various flight control elements to facilitate flight control and operation, which can include control surfaces and/or control actuators. For example, the aircraft 100 can include landing gear (e.g., retractable landing gear, powered/unpowered wheels, fixed landing gear, nacelle struts, etc.), flight control surfaces (e.g., flaps, elevators, ailerons, rudders, ruddervators, spoilers, slats, air brakes, etc.), flight instruments (e.g., altimeter, airspeed indicator and measurement device, vertical speed indicator and measurement device, compass, attitude indicator and measurement device, heading indicator and measurement device, turn indicator and measurement device, flight director systems, navigational systems, and any other suitable instruments), and any other suitable components. The various components can be coupled to the aircraft 100 in any suitable manner; for example, the flight control surfaces can be coupled to and/or defined by portions of the airframe and/or the tail; the flight instruments can be arranged within a payload housing (e.g., cockpit) of the aircraft 100 and/or at a remote operation location (e.g., a teleoperation facility, a remote piloting location, etc.); or otherwise arranged.

In variants, the payload housing of the aircraft (e.g., a payload housing pod, payload housing built into the airframe, etc.) can include an empennage, including any suitable set of flight control surfaces.

The aircraft can optionally include an empennage which functions to stabilize the aircraft by balancing aerodynamic moments in the forward configuration. The empennage can include a set of stabilizers 123, which can include lateral stabilizers (e.g., a rear wing) and/or vertical stabilizers (e.g., tail fin). The lateral stabilizer preferably does not include an elevator (or ruddervator) or other actuator, but can alternately include an elevator or other control surface. The vertical stabilizer or does not include a rudder or other actuator, but can alternately include a rudder or other control surface. Eliminating control surfaces from the vertical and/or lateral stabilizers can reduce weight, reduce the number failure modes, reduce aircraft complexity (e.g., total part count), improve manufacturability, and/or confer any other suitable benefits. Stabilizers can be integrated into the payload housing/cabin, mounted to the payload housing, or otherwise suitably connected to the aircraft. In variants, the empennage can be selectively attachable/detachable (e.g., selectively attached in high wind conditions, etc.), can be formed with and/or manufactured by the same process as the payload housing, can be manufactured separately (of same or different material as the payload housing) and connected to the payload housing, and/or otherwise mounted.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. An electric aircraft system comprising:
   a payload housing;
   an airframe coupled to the payload housing, the airframe comprising:
      a left wing defining a first broad surface;
      a right wing defining a second broad surface;
      a left support member mounted to the left wing, the left support member comprising a first end and a second end arranged on opposite sides of the first broad surface; and
      a right support member mounted to the right wing, the right support member comprising a first end and a second end arranged on opposite sides of the second broad surface;
   a tilt mechanism rotatably coupling the left wing and the right wing to the payload housing, the tilt mechanism configured to transform the electric aircraft system between a forward configuration and a hover configuration by rotating the left wing and right wing between a first and a second position; and
   a plurality of propulsion assemblies comprising:
      a left outboard propulsion assembly mounted to the left wing outboard of the left support member;
      a right outboard propulsion assembly mounted to the right wing outboard of the right support member;
      a first and second inboard propulsion assembly mounted to the first and second ends of the left support member, respectively; and
      a third and fourth inboard propulsion assembly mounted to the first and second ends of the right support member, respectively,
   wherein each of the plurality of propulsion assemblies comprises:
      an electric motor; and
      a propeller rotatably coupled to the electric motor about an axis of rotation at a fixed angle of attack relative to a wing chord line, the fixed angle of attack defined between the axis of rotation and the wing chord line, wherein the fixed angle of attack is non-zero.

2. The electric aircraft system of claim 1, wherein the fixed angle of attack is between 3 degrees and 9 degrees.

3. The electric aircraft system of claim 1, wherein the left wing comprises a torsional stiffening member extending from the tilt mechanism to the left outboard propulsion assembly, wherein the left support member comprises an anti-lateral torsional stiffening member extending from the first propulsion assembly to the second propulsion assembly, wherein the anti-lateral torsional-stiffening member does not intersect the torsional-stiffening member.

4. The electric aircraft system of claim 1, wherein the propeller of each propulsion assembly defines a disc area and a disc plane containing the disc area, wherein the propeller of each propulsion assembly comprises a hub at the center of the disc area, wherein the hub of the second and fourth inboard propulsion assemblies is below a base of the payload housing in the forward configuration.

5. The electric aircraft system of claim 4, wherein the electric aircraft system defines a center of mass, a lateral axis extending through the center of mass, a vertical axis extending through the center of mass, and a lateral-vertical plane containing the lateral axis and the vertical axis, wherein the hub of the first inboard propulsion assembly and the hub of the left outboard propulsion assembly are arranged on opposing sides of the lateral-vertical plane in the forward configuration.

6. The electric aircraft system of claim 5, wherein the tilt mechanism is configured to rotate the left and right wing about a tilt axis, wherein the tilt axis is rearward of the center of mass.

7. The electric aircraft system of claim 5, wherein the left wing and the right wing are anhedral.

8. The electric aircraft system of claim 1, wherein the tilt mechanism is configured to rotate the left and right wings less than 90 degrees between the forward and hover configurations.

9. The electric aircraft system of claim 1, wherein the electric aircraft system does not comprise an elevator, aileron, or rudder.

10. The electric aircraft system of claim 1, wherein the electric aircraft system defines a weight vector and is configured to generate a net lift vector opposing the weight vector during flight, wherein the propulsion assemblies are configured to generate at least 25 percent of the net lift vector during forward flight.

11. The electric aircraft system of claim 1, wherein the electric aircraft system is configured to change a heading of the electric aircraft system during forward flight without banking.

12. The electric aircraft system of claim 1, wherein the propulsion assemblies are configured to simultaneously regenerate electrical energy and generate a net moment about the aircraft center of mass.

13. The electric aircraft system of claim 1, wherein the left and right wings cooperatively define a total projected wing area, wherein the propellers of the propulsion assemblies cooperatively define a total projected blade area, wherein the total projected blade area is between 50% and 200% of the total projected wing area.

14. The electric aircraft system of claim 1, wherein each propeller of the plurality of propulsion assemblies comprises five blades.

15. An electric aircraft system comprising:
a payload housing;
a left wing defining a first broad surface;
a right wing defining a second broad surface;
a left support member mounted to the left wing, the left support member comprising a first end and a second end arranged on opposite sides of the first broad surface; and
a right support member mounted to the right wing, the right support member comprising a first end and a second end arranged on opposite sides of the second broad surface;
a tilt mechanism connecting the left wing and the right wing to the payload housing, the tilt mechanism configured to independently rotate the left wing and the right wing relative to the payload housing; and
a plurality of propulsion assemblies comprising:
a left outboard propulsion assembly mounted to the left wing outboard of the left support member;
a right outboard propulsion assembly mounted to the right wing outboard of the right support member;
a first and second inboard propulsion assembly mounted to the first and second ends of the left support member, respectively; and
a third and fourth inboard propulsion assembly mounted to the first and second ends of the right support member, respectively.

16. The electric aircraft system of claim 15, wherein the left wing comprises a torsional stiffening member extending from the tilt mechanism to the left outboard propulsion assembly, wherein the left support member comprises an anti-lateral torsional stiffening member extending from the first propulsion assembly to the second propulsion assembly, wherein the anti-lateral torsional-stiffening member does not intersect the torsional-stiffening member.

17. The electric aircraft system of claim 15, wherein the electric aircraft system is configured to change a heading of the electric aircraft system during forward flight without banking.

18. The electric aircraft system of claim 17, wherein the electric aircraft system does not comprise an elevator, aileron, or rudder.

* * * * *